US012568400B2

(12) United States Patent
Aio et al.

(10) Patent No.: US 12,568,400 B2
(45) Date of Patent: Mar. 3, 2026

(54) COMMUNICATION APPARATUS AND COMMUNICATION METHOD FOR COOPERATIVE TRANSMISSION BETWEEN A PLURALITY OF ACCESS POINTS

(71) Applicant: SONY GROUP CORPORATION, Tokyo (JP)

(72) Inventors: Kosuke Aio, Tokyo (JP); Kazuyuki Sakoda, Tokyo (JP); Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 365 days.

(21) Appl. No.: 18/247,300

(22) PCT Filed: Aug. 18, 2021

(86) PCT No.: PCT/JP2021/030105
§ 371 (c)(1),
(2) Date: Mar. 30, 2023

(87) PCT Pub. No.: WO2022/079998
PCT Pub. Date: Apr. 21, 2022

(65) Prior Publication Data
US 2024/0014861 A1　Jan. 11, 2024

(30) Foreign Application Priority Data
Oct. 13, 2020　(JP) ................................. 2020-172514

(51) Int. Cl.
*H04W 28/14* (2009.01)
*H04B 7/026* (2017.01)
(Continued)

(52) U.S. Cl.
CPC ............ *H04W 28/14* (2013.01); *H04B 7/026* (2013.01); *H04W 28/0278* (2013.01); *H04W 84/12* (2013.01); *H04W 92/20* (2013.01)

(58) Field of Classification Search
CPC ... H04B 7/024; H04B 7/026; H04W 28/0278; H04W 28/14; H04W 84/12; H04W 92/20
See application file for complete search history.

(56) References Cited

U.S. PATENT DOCUMENTS

2016/0234802 A1　8/2016　Yang
2020/0328857 A1*　10/2020　Ouchi .................. H04B 7/0626
(Continued)

FOREIGN PATENT DOCUMENTS

CN　110691381 A　1/2020
CN　110944358 A　3/2020
(Continued)

OTHER PUBLICATIONS

International Search Report and Written Opinion of PCT Application No. PCT/JP2021/030105, issued on Nov. 16, 2021, 09 pages of ISRWO.
(Continued)

*Primary Examiner* — Pao Sinkantarakorn
*Assistant Examiner* — Pawaris Sinkantarakorn
(74) *Attorney, Agent, or Firm* — CHIP LAW GROUP

(57) ABSTRACT

There is provided a communication apparatus that operates as an access point (AP) that transmits packets to a subordinate station (STA) and an STA connected to another AP includes a storage unit including a transmission buffer that stores packets for each STA, and a control unit that controls processing for sharing information on a sequence number of a transmission buffer for each STA between the APs. The control unit collects the information on the sequence number of the transmission buffer of each STA of each AP, and
(Continued)

controls processing for transmitting packets to each STA on the basis of a difference in information related to the sequence number of the transmission buffer of each STA between the APs.

10 Claims, 33 Drawing Sheets

(51) Int. Cl.
| | | |
|---|---|---|
| *H04W 28/02* | (2009.01) | |
| *H04W 84/12* | (2009.01) | |
| *H04W 92/20* | (2009.01) | |

(56) References Cited

U.S. PATENT DOCUMENTS

| | | | | |
|---|---|---|---|---|
| 2021/0127290 | A1* | 4/2021 | Yang | H04W 72/27 |
| 2022/0070755 | A1* | 3/2022 | Park | H04L 5/0035 |
| 2022/0209825 | A1* | 6/2022 | Chitrakar | H04W 76/15 |
| 2022/0271800 | A1* | 8/2022 | Handte | H04B 7/0413 |

FOREIGN PATENT DOCUMENTS

| | | | |
|---|---|---|---|
| EP | 3806535 | A1 | 4/2021 |
| EP | 3846529 | A1 | 7/2021 |
| JP | 2019-036874 | A | 3/2019 |
| WO | 2008/065697 | A1 | 6/2008 |
| WO | 2011/155256 | A1 | 12/2011 |
| WO | WO-2020191753 | A1 | 10/2020 |

OTHER PUBLICATIONS

Vermani, et al., "Terminology for AP Coordination", Qualcomm, IEEE 802.11-18/1926r2, Nov. 14, 2018, 10 pages.

Ryu, et al., "Consideration on multi-AP coordination for EHT", LG Electronics, IEEE 802.11-18/1982r1, Jan. 9, 2019, 10 pages.

* cited by examiner

1

COMMUNICATION APPARATUS AND COMMUNICATION METHOD FOR COOPERATIVE TRANSMISSION BETWEEN A PLURALITY OF ACCESS POINTS

CROSS REFERENCE TO RELATED APPLICATIONS

This application is a U.S. National Phase of International Patent Application No. PCT/JP2021/030105 filed on Aug. 18, 2021, which claims priority benefit of Japanese Patent Application No. JP 2020-172514 filed in the Japan Patent Office on Oct. 13, 2020. Each of the above-referenced applications is hereby incorporated herein by reference in its entirety.

TECHNICAL FIELD

The technology disclosed in the present specification (hereinafter referred to as "the present disclosure") relates to a communication apparatus and a communication method for performing cooperative transmission between a plurality of access points.

BACKGROUND ART

In recent years, a multi-AP coordination technology aiming at improving a throughput or reliability of a system in cooperation among APs has been attracting attention in an environment in which a plurality of access points of a wireless local area network (LAN) (hereinafter referred to as "APs") are installed in a stadium or home. Joint Transmission (hereinafter referred to as "Joint Tx") that is such one technology is a technology for cooperative transmission to a wireless terminal (station; hereinafter referred to as "STA") using a plurality of APs while using a multiple input multiple output (MIMO) technology, and is capable of high-dimensional beam formation without increasing the number of antennas associated with one AP (see NPL 1 and NPL 2).

In order to realize Joint Tx, a plurality of APs should perform the same PHY processing (encoding, modulation, transmission weight calculation processing, and the like) on the same packets and transmit resultant packets at the same timing. However, sequence numbers for managing packets shared among the APs and packets to be transmitted to STAs are assigned and decoded by respective communication units. Therefore, for example, in a case in which a certain AP fails in acquisition of a packet when the packet is transmitted from a backhaul, different sequence numbers are assigned to the same packet among a plurality of APs, and a correct data signal for Joint Tx cannot be generated.

It is conceivable that problems like those described above will not occur when packet management can be performed in cooperation with a layer (TCP/IP or the like) that can bridge between communication units of a backhaul and a fronthaul. However, at least current chipsets of a wireless LAN generally perform packet processing independently in respective layers. Considering chipsets that do not easily perform cooperation with an upper layer in this way, it is conceivable that it is preferable for the AP to be able to check whether the AP holds the same packet as surrounding APs at a level of a MAC layer and determine whether Joint Tx is possible.

CITATION LIST

Non Patent Literature

[NPL 1]
    IEEE 802.11-18-1926r2
[NPL 2]
    IEEE 802.11-18-1982r1

2

SUMMARY

Technical Problem

An object of the present disclosure is to provide a communication apparatus and a communication method for performing cooperative transmission according to Joint Tx between a plurality of access points.

Solution to Problem

The present disclosure has been made in consideration of the above problems, and a first aspect thereof is a communication apparatus configured to operate as an AP configured to transmit packets to a subordinate STA and an STA connected to another AP, the communication apparatus including:

a storage unit including a transmission buffer configured to store packets for each STA; and a control unit configured to control processing for sharing information on a sequence number of a transmission buffer for each STA between the APs.

The control unit collects the information on the sequence number of the transmission buffer of each STA of each AP, and controls processing for updating the transmission buffer of each AP on the basis of a difference in information related to the sequence number of the transmission buffer of each STA between the APs. Alternatively, the control unit transmits information on the sequence number of the transmission buffer for each STA of the AP to the other AP on the basis of a request from the other AP.

The control unit performs processing for updating a state of the transmission buffer of the other AP on the basis of a state of a transmission buffer of a connection destination AP of the STA when there is a difference in information on the sequence number of the transmission buffer addressed to one of STAs between the APs.

The control unit performs processing for updating a state of the transmission buffer of the AP on the basis of the transmission buffer of the connection destination AP of the STA when a difference is generated in information related to a sequence number before a previously confirmed sequence number in the transmission buffer addressed to one of the STAs. Further, the control unit deletes information after previous checked information addressed to the STA from the transmission buffer of the AP when a difference is generated in information related to a sequence number after a previous checked sequence number in the transmission buffer addressed to a non-subordinate STA.

A second aspect of the present disclosure is a communication method in an AP configured to transmit packets to a subordinate STA and an STA connected to another AP, the communication method including:

storing packets for each STA in a transmission buffer; and sharing information related to a sequence number of the transmission buffer for each STA between the APs.

Advantageous Effects of Invention

According to the present disclosure, it is possible to provide a communication apparatus and a communication method for sharing information on the sequence number of the transmission buffer for each destination among APs and generating a correct data signal for Joint Tx.

The effects described in the present specification are merely examples, and the effects provided by the present disclosure are not limited thereto. Further, the present disclosure may have additional effects, in addition to the effects described above.

Still other objects, characteristics, and advantages of the present disclosure will become apparent from more detailed description based on embodiments to be described below or the accompanying drawings.

DESCRIPTION OF EMBODIMENTS

Hereinafter, the present disclosure will be described in the following order with reference to the drawings.
A. Overview
B. System Configuration
C. Device Configuration
D. Example of Packet Acquisition (Raising Problems)
E. Specific Embodiment
E-1. First Example
E-1-1. Entire Sequence
E-1-2. Communication Sequence in JTBB Setup Phase
E-1-3. Frame Configuration Example
E-1-4. Operation in JTBB Setup Phase
E-1-5. Communication Sequence in JTX Phase
E-1-6. Frame Configuration Example
E-1-7. Operation in JTX Phase
E-1-8. Effects
E-2. Second Embodiment
E-2-1. System Configuration
E-2-2. Device Configuration
E-2-3. Packet Acquisition Example
E-2-4. Entire Sequence
E-2-5. Frame Configuration Example
E-2-6. Operation of Master AP and Non-Master AP
E-2-7. Internal Operation
E-2-8. Effects
F. Effects

A. Overview

In the present disclosure, according to the following procedure, information related to a sequence number of a transmission buffer for each STA is shared between APs to correctly generate packets for cooperative transmission according to Joint Tx.

(1) When there is a difference in information on the sequence number of the transmission buffer between APs, the transmission buffer of the other AP is updated on the basis of the information of the transmission buffer of the AP that is a connection destination of the STA.

(2) When a multi-hop network is constructed between the APs, transmission buffer information between the AP and the STA and transmission buffer information between the APs are shared together.

(3) When the AP acquires a transmission right or receives a cooperative transmission request from the other AP, the AP checks whether or not the other AP holds a packet to be transmitted, on the basis of information related to the sequence number of the transmission buffer for each STA shared between the APs, and performs a determination as to whether or not cooperative transmission is able to be performed, and selection of an AP of which the cooperative transmission is requested.

(4) One predetermined AP collects information on the sequence number of the transmission buffer for each STA of each AP.

One AP that collects information on the sequence number of the transmission buffer for each STA of each AP is hereinafter referred to as a "master AP."

B. System Configuration

Figure 1:
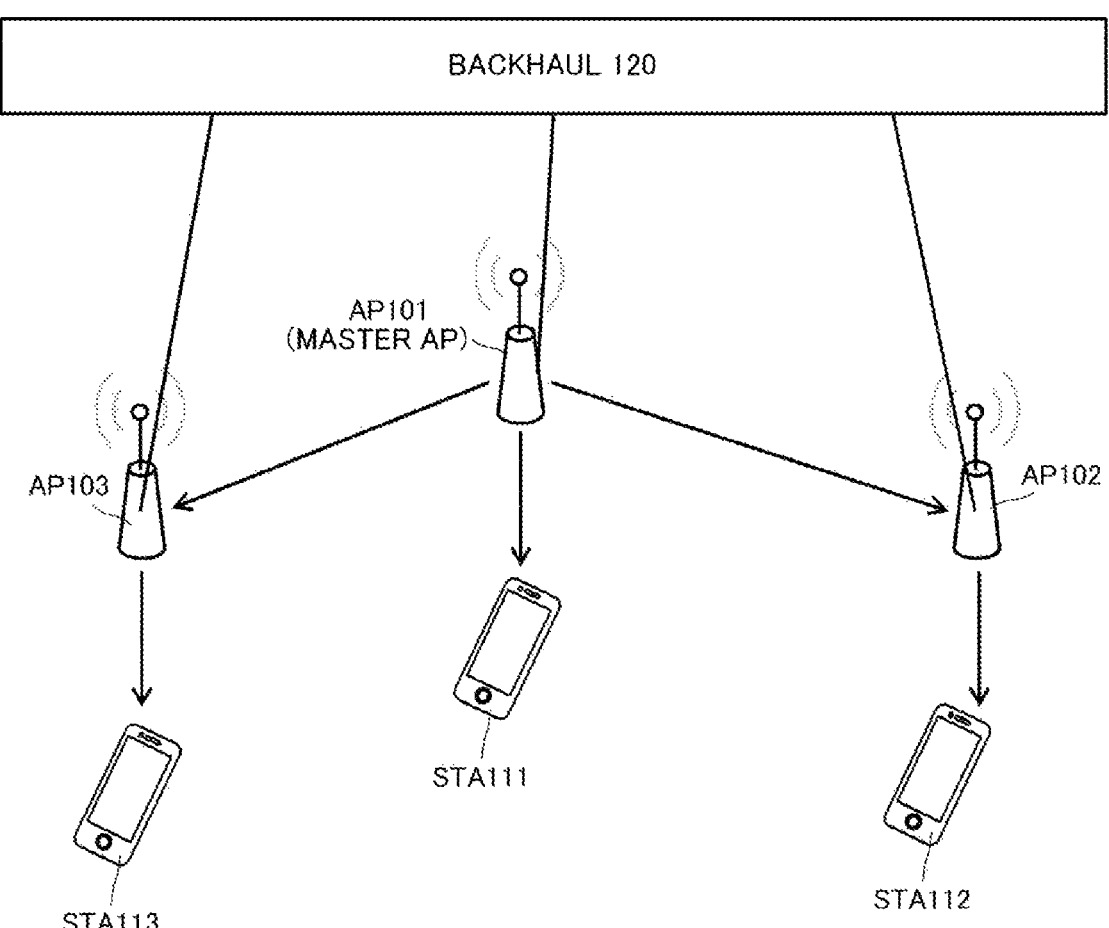
FIG. 1 is a diagram illustrating a configuration example of a system 100 to which the present disclosure is applied.

FIG. 1 illustrates a configuration example of the system 100 to which the present disclosure is applied. It is assumed that in the illustrated system 100, there are three APs (base stations) 101 to 103 and three STAs (child stations) 111 to 113. It is assumed that an STA 111 is connected to the AP 101, an STA 112 is connected to the AP 102, and an STA 113 is connected to the AP 103. Normally, packets addressed to each STA are transmitted only from each AP that is a connection destination. When Joint Tx is performed, the same packet addressed to a certain STA is also transmitted from an AP other than the connection destination.

It is assumed that all the APs 101 to 103 are connected to a backhaul 120, and the packets addressed to each STA are transmitted from a higher level (not illustrated) via the backhaul 120. Normally, the AP may interpret a final destination address assigned to an Internet protocol (IP) header or a media access control (MAC) header of the packet, hold the packet when the address indicates a subordinate STA, and discard the packet when the STA indicated by the address is not subordinate. On the other hand, in a case in which Joint Tx is performed, the AP should hold packets addressed to all STAs that can perform cooperative transmission instead of discarding the packets even when the STA indicated by the final destination address is not subordinate.

Here, one AP that can perform communication with all other cooperative candidate APs other than the AP is called a "master AP." It is assumed that the master AP performs collection of information for cooperative transmission, sharing with other APs, and Joint Tx execution determination based on the collected information. The following description will describe a case in which only the AP 101 among the three APs 101 to 103 is set as the master AP. Of course, another AP (the AP 102 or 103) may be set as the master AP as long as it can perform communication with all the other cooperative candidate APs other than the other AP. Further, a plurality of master APs may be present in the same group. For convenience, the APs other than the master AP are collectively referred to as non-master APs.

A configuration of the system 100 to which the present disclosure is applied is not limited to that illustrated in FIG. 1. There may be a plurality of communication apparatuses with which connection has been established, there may be a communication apparatus as a peripheral terminal with respect to each communication apparatus, and a positional relationship between each AP and each STA is not limited to the example illustrated in FIG. 1 as long as a condition that at least one communication apparatus can perform communication with all other cooperative candidates other than the communication apparatus is satisfied.

C. Device Configuration

Figure 2:
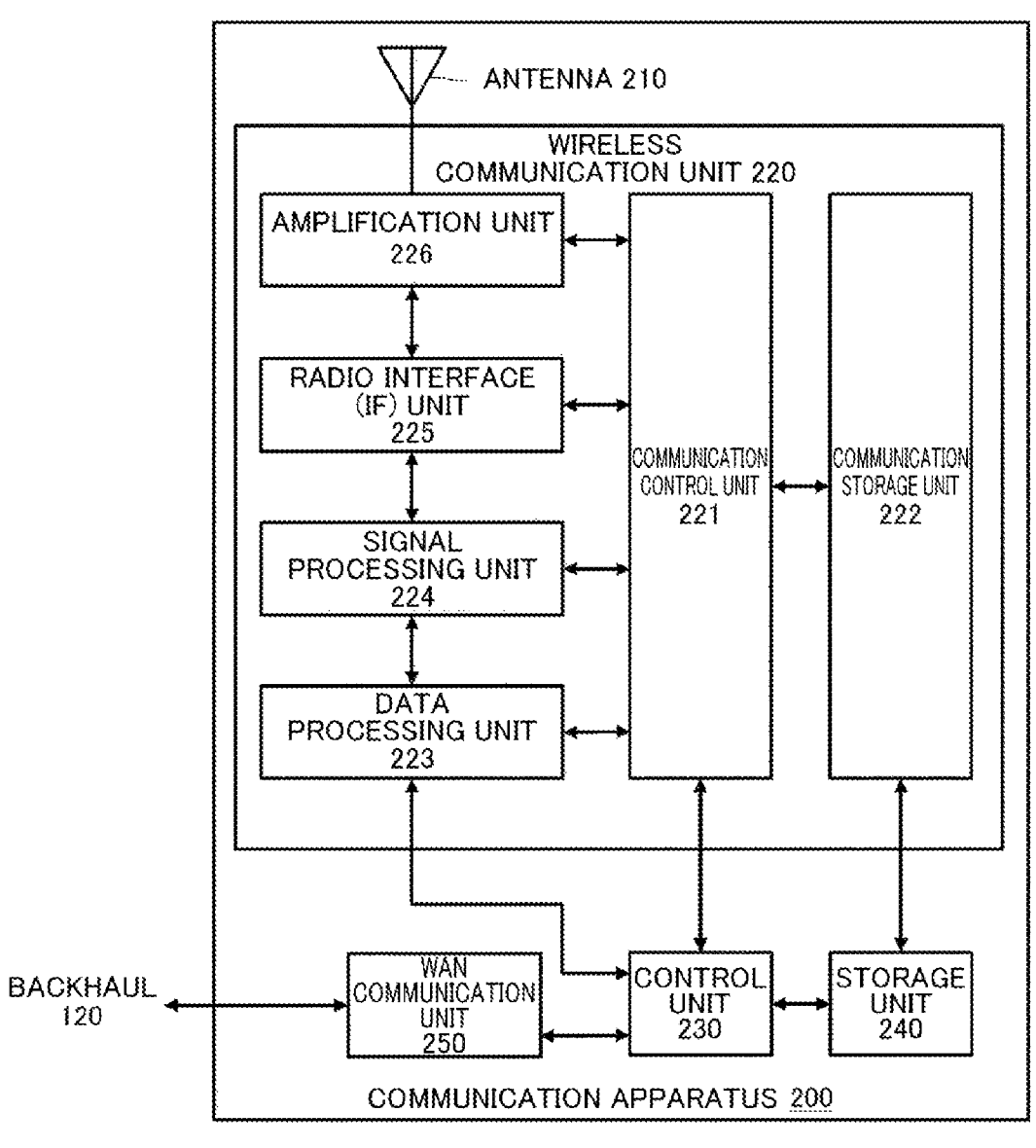
FIG. 2 is a diagram illustrating a configuration example of a communication apparatus 200 operating as an AP.

FIG. 2 illustrates a configuration example of a communication apparatus 200 that operates as an AP. The illustrated communication apparatus 200 includes an antenna 210, a wireless communication unit 220, a control unit 230, a storage unit 240, and a wide area network (WAN) communication unit 250. The wireless communication unit 220 further includes a communication control unit 221, a communication storage unit 222, a data processing unit 223, a signal processing unit 224, a wireless interface (IF) unit 225, and an amplification unit 226.

The communication control unit 221 performs control of operations of respective units in the wireless communication unit 220 and information transfer between the units. Further, the communication control unit 221 performs control for transferring control information and management information of which other communication apparatuses are notified to the data processing unit 223. In the present embodiment, the communication control unit 221 performs notification and collection of information on the sequence number of data stored in the communication storage unit 222 and updating of the transmission buffer in the communication storage unit 222.

The communication storage unit 222 holds information that is used by the communication control unit 221. Further, the communication storage unit 222 holds packets to be transmitted, and received packets. It is assumed that the transmission buffer that holds the packets to be transmitted is included in the communication storage unit 222.

At the time of transmission, the data processing unit 223 performs sequence management of data held in the communication storage unit 222 and the control information and management information received from the communication control unit 221, performs processing such as encryption, and then performs addition of the MAC header and addition of an error detection code to generate a packet. Further, the data processing unit 223 performs processing for concatenating a plurality of packets. The data processing unit 223 performs processing for releasing concatenation of a MAC header of a received packet, analysis and error detection, a retransmission request operation, and reorder processing at the time of reception.

The data processing unit 223 stores the packets in the communication storage unit 222 until an appropriate timing for transmission and reception. The appropriate timing is a time when the communication apparatus 200 acquires a transmission right and becomes able to perform data transmission at the time of transmission, and is a time at which reordering processing of the packet has been completed at the time of reception (that is, a time when all packets with sequence numbers before the packet can be acquired). A state in which the packets are not concatenated is assumed as a format in which the packets are stored in the communication storage unit 222. Hereinafter, a block that stores transmission packets in the communication storage unit 222 is called a transmission buffer.

At the time of transmission, the signal processing unit 224 performs encoding, interleaving, modulation processing, and the like on the packet, and adds a physical header to generate a symbol stream. Further, the signal processing unit 224 analyzes the physical header and performs processing such as a plurality of multiple wins, deinterleaving, and decoding on the symbol stream to reproduce a packet at the time of reception. Further, the signal processing unit 224 performs estimation of complex channel characteristics, and spatial separation processing as necessary.

The wireless interface unit 225 performs digital-analog signal conversion, filtering, up-conversion, and phase control on the symbol stream to generate a transmission signal at the time of transmission. Further, the wireless interface unit 225 performs down-conversion, filtering, and analog-digital signal conversion on a received signal to reproduce the symbol stream at the time of reception.

The amplification unit 226 amplifies the signal input from the wireless interface unit 225 or the antenna 210. A part of the amplification unit 226 may be a component outside the wireless communication unit 220. Further, a part of the amplification unit 226 may be included in the wireless interface unit 225.

The control unit 230 controls the communication control unit 221 and the data processing unit 223 in the wireless communication unit 220. Further, the control unit 230 may perform a part of the operation of the communication control unit 221 instead. Further, the control unit 230 may be configured as one block together with the communication control unit 221.

The storage unit 240 holds information used by the control unit 230 and the communication unit 220. Further, the storage unit 240 may perform a part of the operation of the communication storage unit 222 instead. Further, the storage unit 240 and the communication storage unit 222 may be configured as one block.

The WAN communication unit 250 decodes the packet acquired from the backhaul 120 via the WAN, and transfers the packet to the wireless communication unit 220 through the control unit 230. A format of the transferred packet here may be either a state in which an IP header is left as it is (an access point mode) or a state in which the IP header is decoded and removed by the WAN communication unit 250 (a router mode).

The wireless communication unit 220 can be configured as one integrated circuit (IC), but a configuration of the IC is not limited thereto. For example, the wireless interface unit 225 may be mounted as another IC.

D. Packet Acquisition Example

In the system 100 illustrated in FIG. 1, each of the APs 101 to 103 acquires packets addressed to each of the STAs 111 to 113 from the backhaul 120 in a random order.

These packets are transmitted to the wireless communication unit 220 inside each of the APs 101 to 103, added with an MAC header and error detection codes, and stored in the communication storage unit 222 until the transmission right is acquired. In this case, according to an IEEE 802.11 specification, each of the APs 101 to 103 assigns a sequence number (SN) to each of the STA and traffic identifier (TID) to manage packets.

Figure 3:
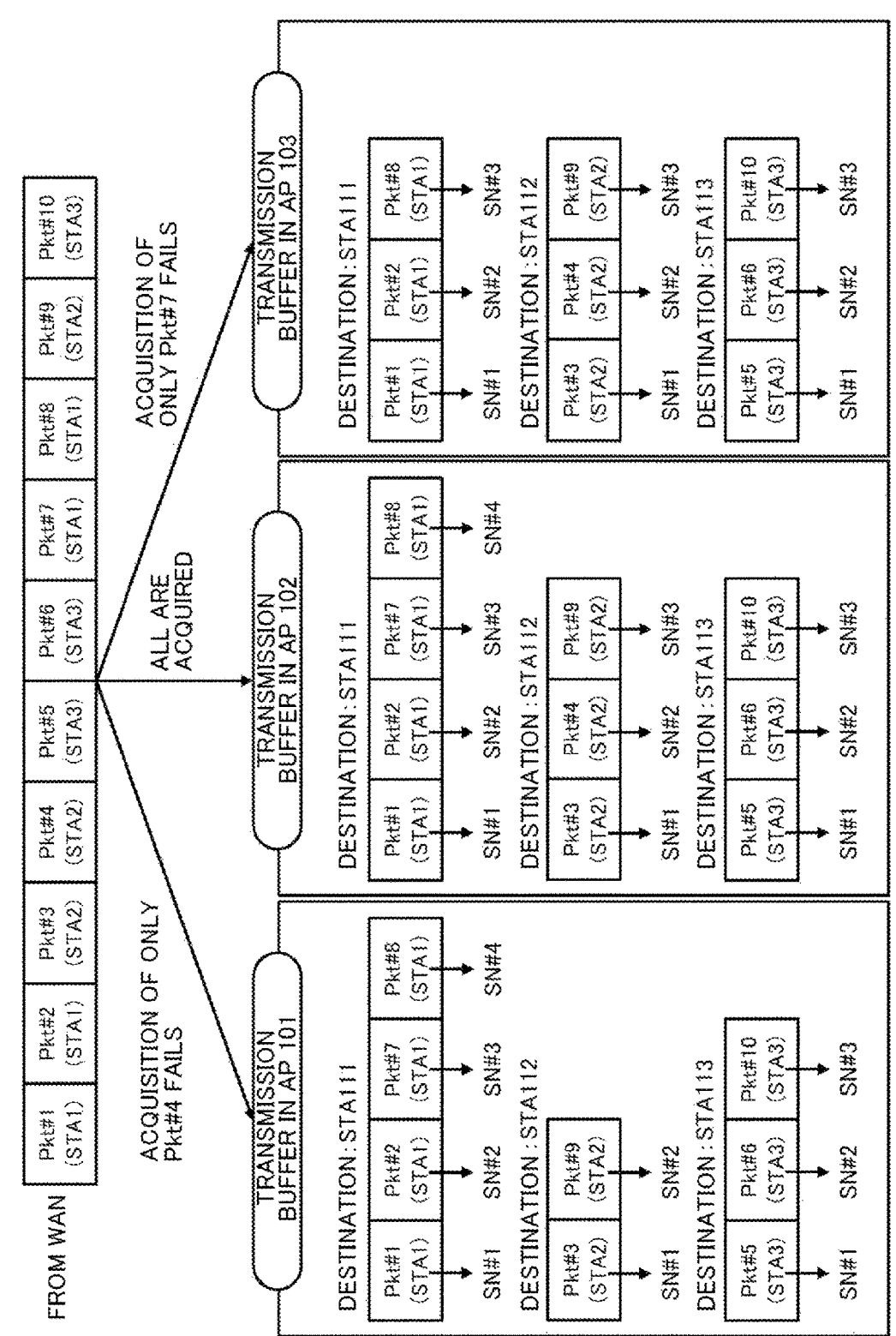
FIG. 3 is a diagram illustrating an example in which each AP manages packets acquired in a random order from a backhaul.

In FIG. 3, an example in which each of the APs 101 to 103 acquires the 10 packets (Pkt) #1 to #10 addressed to the STAs 111 to 113 from the backhaul 120 in a random order, and assigns a sequence number to each of the STA and the TID to manage the packets is illustrated. Here, in FIG. 3, it is assumed that the same TID is assigned to all packets for the sake of simplicity of description.

In the example illustrated in FIG. 3, the AP 102 normally acquires all the 10 packets (Pkt) #1 to #10 from the backhaul 120 via the WAN, and assigns a sequence number to each destination STA to manage the packets. On the other hand, the AP 101 fails in acquisition of only the packet #4, normally acquires the other packets, and assigns a sequence number to each destination STA to manage the packets. Further, the AP 103 fails in acquisition of only the packet #7, but normally acquires the other packets, and assigns a sequence number to each destination STA to manage the packets.

When Joint Tx is performed, the APs 101 to 103 performing the cooperative transmission hold the same packet, and it is necessary for the same sequence number to be assigned to the same packets held by the respective APs 101 to 103 so that the packet for cooperative transmission can be indicated accurately.

However, when a difference is generated in the packets acquired from the backhaul 120 among the APs 101 to 103, this means that different packets are indicated by the same sequence number. In the example illustrated in FIG. 3, since the AP 101 has failed in acquisition of packet #4, one packet addressed to the STA 112 is missing when compared with the AP 102 and the AP 103. Further, since the AP 103 has failed in acquisition of packet #7, one packet addressed to the STA 111 is missing when compared with the AP 102 and the AP 101.

For example, when the backhaul 120 performs communication conforming to the IEEE 802.3 (Ethernet (registered trademark)) standard, the WAN communication unit 250 of each of the APs 101 to 103 does not perform retransmission control in the MAC layer. Therefore, the WAN communication unit 250 transmits a received signal to the wireless communication unit 220 as it is without performing reordering processing, and the data processing unit 221 in the wireless communication unit 220 assigns a sequence number to each of the STA and the TID in order without recognizing that a packet loss has occurred.

In the example illustrated in FIG. 3, only the AP 101 indicates the packet addressed to the STA 112 whose sequence number #2 is different from those of the AP 102 and the AP 103. As a result, even when the APs 101 to 103 cooperatively transmit a packet with sequence number #2 to the STA 112 via Joint Tx, the STA 112 is unable to correctly acquire the signal. Further, only the AP 103 indicates a packet addressed to the STA 111 whose sequence number #3 is different from those of the AP 101 and the AP 102. As a result, even when the APs 101 to 103 cooperatively transmit the packet with sequence number #3 to the STA 111 through Joint Tx, the STA 111 is unable to acquire a signal correctly.

In short, in the example illustrated in FIG. 3, a problem arises that the sequence numbers of the same packet do not match between the APs at the time of cooperative transmission due to the failure of packet acquisition from the backhaul 120 of each AP.

Figure 4:
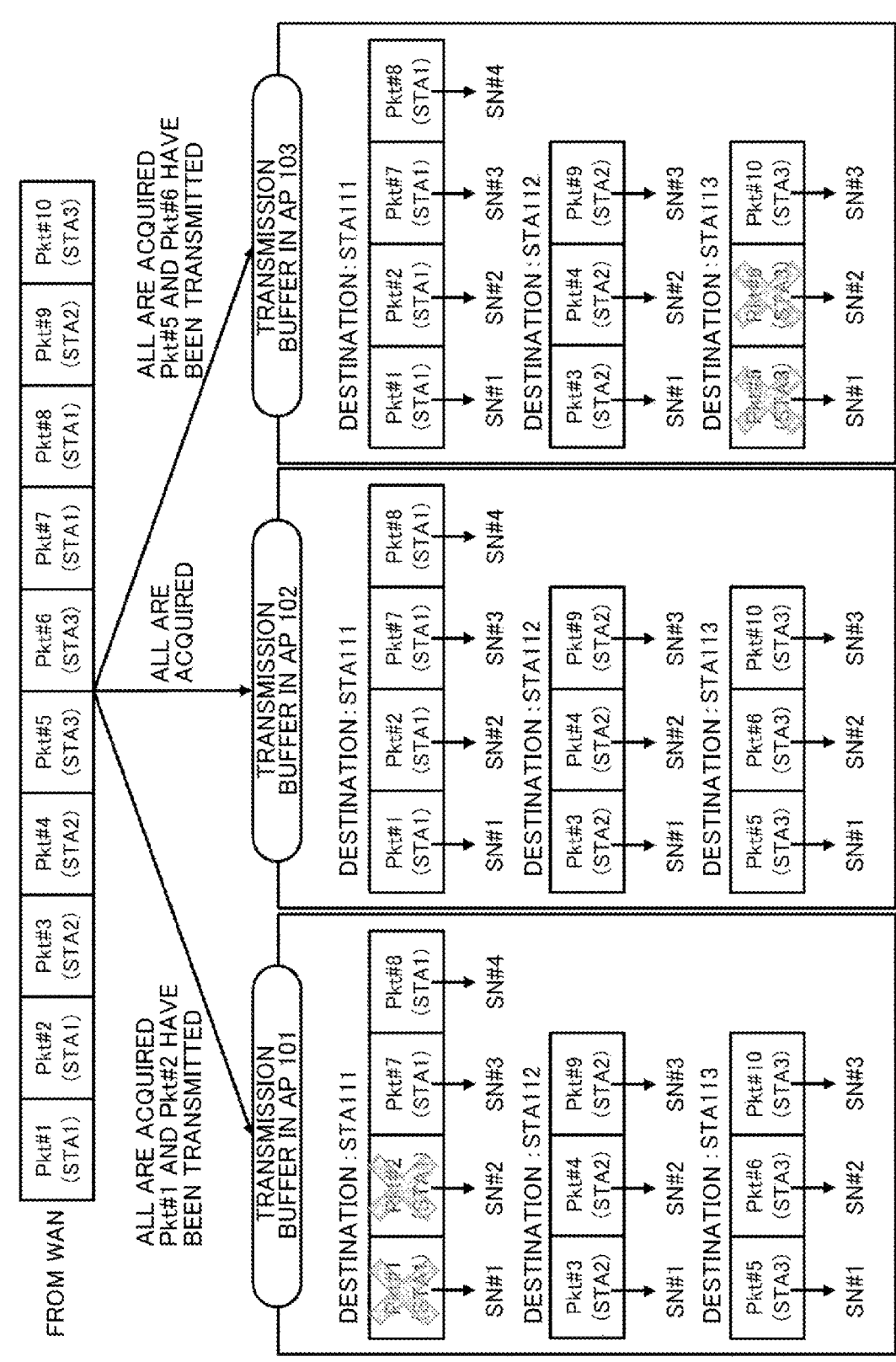
FIG. 4 is a diagram illustrating another example in which each AP manages packets acquired in a random order from the backhaul.

In FIG. 4, another example in which each of the APs 101 to 103 acquires the 10 packets (Pkt) #1 to #10 addressed to the STAs 111 to 113 from the backhaul 120 in a random order, and assigns a sequence number to each of the STA and the TID to manage the packets is illustrated. Here, in FIG. 4, it is assumed that the same TID is assigned to all packets for the sake of simplicity of description.

In the example illustrated in FIG. 4, it is assumed that each of the APs 101 to 103 has normally acquired all packets (Pkt) #1 to #10 from the backhaul 120 via the WAN. Here, for example, it is assumed that a certain AP does not perform cooperative transmission with the other APs and performs data transmission to its subordinate STA depending on operation modes of the AP. In the example illustrated in FIG. 4, the AP 101 transmits packet #1 (SN #1) and packet #2 (SN #2) addressed to the subordinate STA 111 without cooperating with other APs, and deletes these packets from the transmission buffer when receiving a response signal (Ack) from the STA 111. On the other hand, the AP 102 and the AP 103 continue to hold packet #1 (SN #1) and packet #2 (SN #2) for cooperative operation without recognizing that the AP 101 has already transmitted packet #1 (SN #1) and packet #2 (SN #2). Due to time-out processing, the AP 102 and the AP 103 may eventually remove these packets from the transmission buffers thereof. However, when the transmitted packets continue to be held, a free space in the transmission buffer becomes insufficient and new packets cannot be stored in the transmission buffer.

Further, the AP 103 transmits packet #5 (SN #1) and packet #6 (SN #2) addressed to the subordinate STA 113 without cooperating with other APs, and deletes these packets from the transmission buffer when receiving a response signal (Ack) from the STA 113. On the other hand, the AP 101 and the AP 102 continue to hold packet #5 (SN #1) and packet #6 (SN #2) for cooperative operation without recognizing that the AP 103 has already transmitted packet #5 (SN #1) and packet #6 (SN #2). Due to time-out processing, the AP 101 and the AP 102 may eventually remove these packets from the transmission buffers thereof. However, when the transmitted packets continue to be held, a free space in the transmission buffer becomes insufficient and new packets cannot be stored in the transmission buffer.

In short, in the example illustrated in FIG. 4, a problem of stagnation in the transmission buffer of packets that have been transmitted in the other AP due to non-execution of the cooperative transmission in some APs in the group arises.

It is possible to solve both the problem of packet acquisition failure of each AP illustrated in FIG. 3 and the problem of the stagnation in the transmission buffer of packets that have been transmitted, which is illustrated in FIG. 4, by sharing situations in the transmission buffers among the APs 101 to 103. The present disclosure proposes a method of exchanging or notifying of information related to the sequence number of each packet for each of the STA and the TID in the transmission buffer between APs as information for solving problems in packet management.

E. Specific Embodiment

The present disclosure is mainly characterized in that first information related to the sequence number of each packet in the transmission buffer is shared between APs to manage shared data for cooperative transmission. Hereinafter, a first embodiment and a second embodiment according to the configuration of the backhaul will be described.

TABLE 1

| | Configuration of backhaul |
|---|---|
| First embodiment | All APs are connected by wire |
| Second embodiment | Only one AP is connected by wire and multi-hop network |

Embodiment 1

E-1. First Embodiment

A first example assumes a system in which all APs are connected to a backhaul by wire. Hereinafter, the first embodiment will be described on the premise that all the APs 101 to 103 are connected to the backhaul 120 by wire in the system 100 illustrated in FIG. 1.

E-1-1. Entire Sequence

Figure 5:
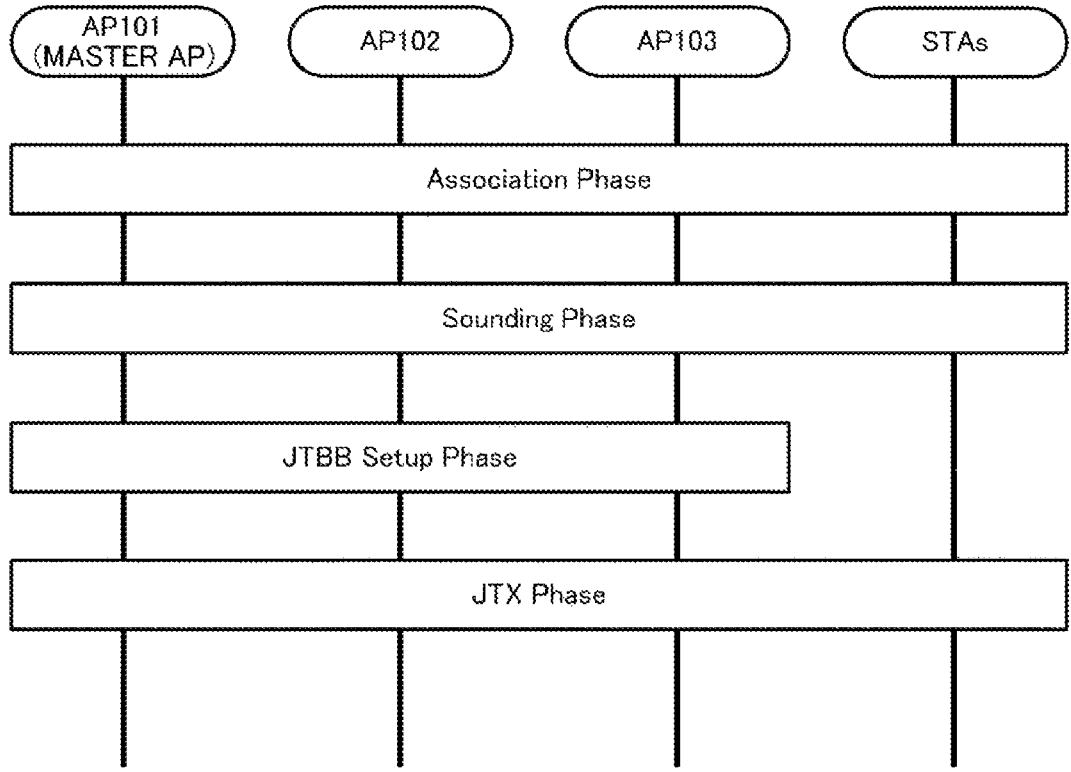
FIG. 5 is a diagram illustrating a communication sequence example (first embodiment) of the system 100.

FIG. 5 illustrates a communication sequence example of the system 100 in the first embodiment. The illustrated communication sequence includes respective phases of Association, Sounding, JTBB Setup, and JTX. Hereinafter, the respective phases will be described.

In the Association phase, connection processing between an AP and an STA in the same cell and connection processing between APs for a cooperative operation are performed. In the Association phase, information on the STA in each cell and Capability information of each apparatus (for example, whether or not a Joint Tx operation is possible) are exchanged.

In the Sounding phase, the AP collects information on channel information or a transmission weight required for Joint Tx from the STA. Specifically, a plurality of APs transmit a known signal (for example, NDP (Null Data Packet)) at the same time, and the STA performs channel estimation and then feeds back a channel estimation result or transmission weight information required for Joint Tx (for example, Compressed BF V matrix) to the AP. The information collected by each AP may be further collected by the master AP, or may be shared by all the APs.

In the Joint Tx Buffer Bitmap (JTBB) Setup phase, transmission buffer information is shared between APs. In the present embodiment, it is assumed that the master AP periodically starts the JTBB Setup phase. However, an AP other than the master AP may start the JTBB Setup phase, or the AP other than the master AP may request the master AP to execute the JTBB Setup phase. Further, the JTBB Setup phase may be executed each time the JTX (Joint Tx) phase is started. Each AP includes a packet transmission buffer for each of the STA and the TID (here, in the present specification, the packets addressed to each STA are assumed to have the same TID for simplification of description).

Here, JTBB describing the state of the transmission buffer in a bitmap format is used as the transmission buffer information. For example, when the transmission buffer stores a maximum of 64 packets, the JTBB consists of 64 bits, that is, 8 bytes. With a start sequence number (Start Sequence Number) of the packet stored in the transmission buffer for each STA, and the JTBB, the sequence number (how many packets are stored from the start sequence number) of the packet addressed to each STA stored in the transmission buffer can be represented.

In the JTX phase, data transmission according to Joint Tx is performed. Details of this phase will be described below.

E-1-2. JTBB Setup Phase

Figure 6:
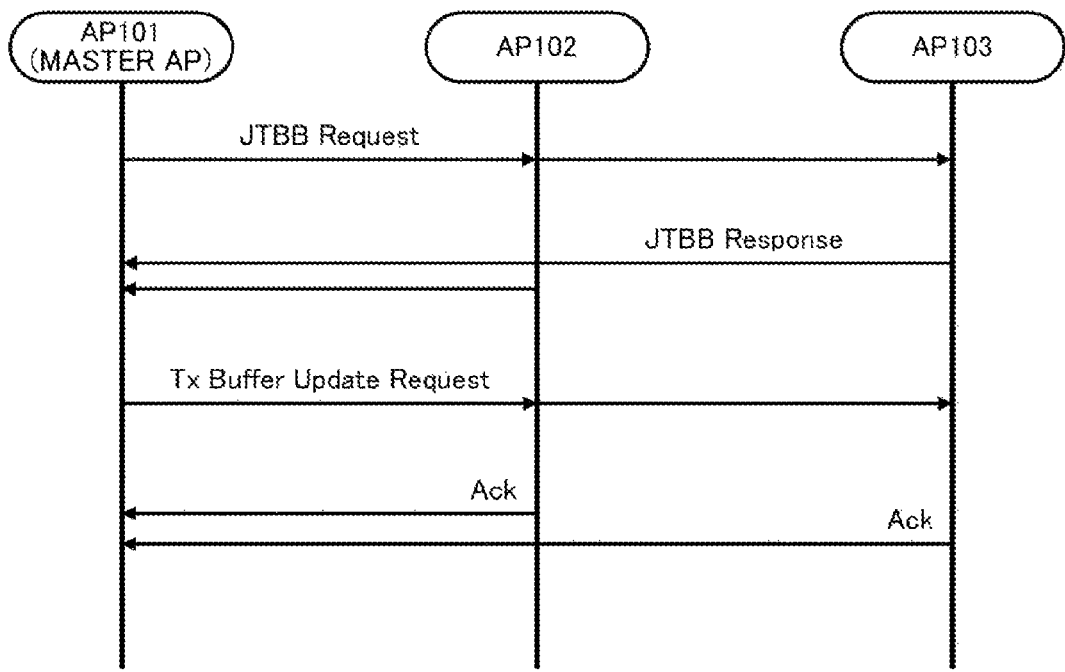
FIG. 6 is a diagram illustrating a detailed communication sequence example in a JTBB Setup phase.

FIG. 6 illustrates a detailed communication sequence example of the JTBB Setup phase performed among the APs 101 to 103 in the system 100 illustrated in FIG. 1.

First, the AP 101, which is the master AP, transmits a JTBB Request frames to the AP 102 and the AP 103, and collects a JTBB Response frame from the AP 102 and the AP 103. Details of the JTBB Request frame and the JTBB Response frame will be described below.

Thereafter, the AP 101 determines whether or not update of the transmission buffer of at least one of the AP 102 and the AP 103 is required from the transmission buffer information of each of the APs 101 to 103. The AP 101 basically determines whether or not it is necessary to update the transmission buffer on the basis of a difference in the transmission buffer between the APs, but details thereof will be described below.

Only when the AP 101 determines that the update of the transmission buffer is required, the AP 101 transmits a Tx Buffer Update Request frame for requesting the update of the transmission buffer to the AP. The AP receiving the Tx Buffer Update Request frame updates its own transmission buffer and then returns an Ack to the AP 101. In a communication sequence example illustrated in FIG. 6, the AP 101 transmits the Tx Buffer Update Request to each of the AP 102 and the AP 103, and the AP 102 and the AP 103 each return an Ack to the AP 101.

E-1-3. Frame Configuration Example

This section describes a configuration of a frame used in the JTBB Setup phase.

Figure 7:
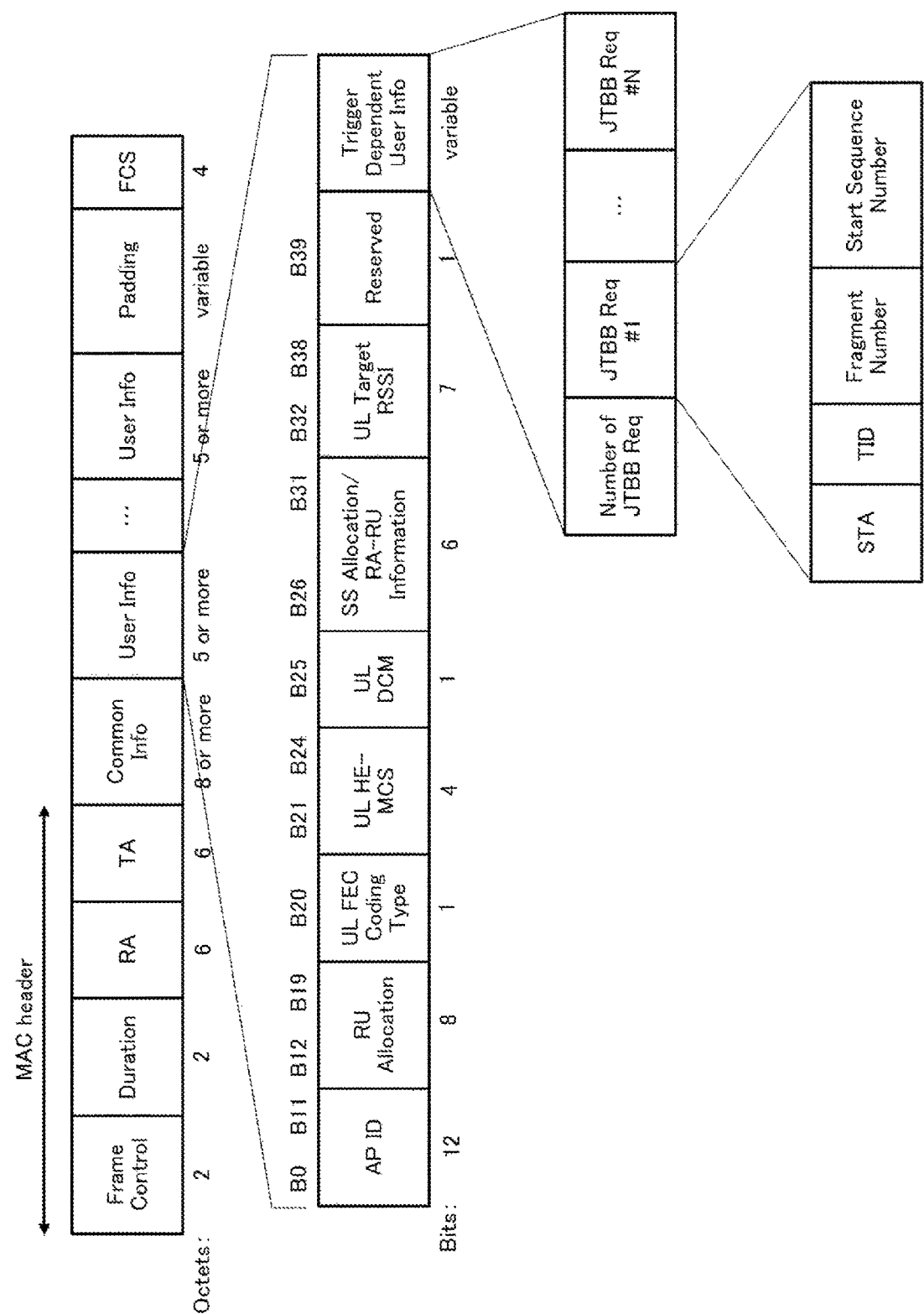
FIG. 7 is a diagram illustrating a configuration example of a JTBB Request frame.

FIG. 7 illustrates a configuration example of the JTBB Request frame used in the JTBB Setup phase. The illustrated JTBB Request frame is configured on the basis of a Trigger frame of the IEEE 802.11ax, but a configuration and a variable name of the frame are not particularly limited as long as information of each of the following AP ID, Number of JTBB Req, and JTBB Req is included.

Identification information of the AP is stored in the AP ID field AP. When an association has been completed between the master AP and the non-master AP, an AID (Association ID) or another identifier may be stored in the field.

The number of requests for Joint Tx Buffer Bitmap (JTBB) information is stored in a Number of JTBB Req field. The request for the JTBB information may be made by designating identification information (for example, AID) of the destination STA and traffic identification information (TID). It is also possible to make the request for the JTBB information without designating the STA and the TID.

JTBB Req fields are included in the JTBB Request frame by the number described in the Number of JTBB Req field. Information on a range of the sequence number to be collected in the requesting destination STA and TID is stored in each JTBB Req field. Specifically, fields of the STA ID, TID, Fragment Number, and Start Sequence Number are included in each JTBB Req field. The identification information of each of the STA indicating the destination of the transmission buffer and the traffic to be queried to the AP designated by the AP ID is stored in the field of each of the STA ID and TID. The Start Sequence Number is a first number among the sequence numbers to be collected, and the request destination AP returns bitmap information of the transmission buffer following this start sequence number (which will be described below).

Figure 8:
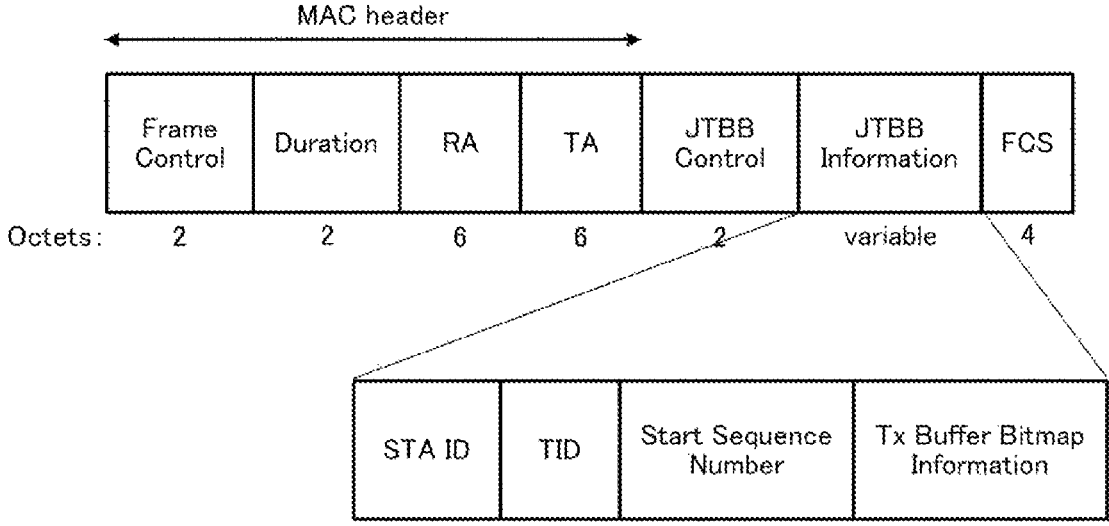
FIG. 8 is a diagram illustrating a configuration example of a JTBB Response frame.

FIG. 8 illustrates a configuration example of the JTBB Response frame used in the JTBB Setup phase. The illustrated JTBB Response frame is configured on the basis of an Action frame of the IEEE 802.11-2016, but a configuration and a variable name of the frame are not particularly limited as long as each of the following JTBB Control and JTBB Information is included.

Information on a JTBB Info expression method, such as Multi-TID or Compressed is stored in a JTBB Control field.

The transmission buffer information for each requested destination STA and traffic information is stored in the JTBB Information field. Specifically, the JTBB Information field consists of fields of STA ID, TID, Start Sequence Number, and Tx Buffer Bitmap Information.

The identification information of the STA indicating the destination of the transmission buffer and the traffic stored in the JTBB Info field is stored in each of fields of the STA ID and the TID. The start sequence number of the packet to the destination indicated by the STA ID and the TID, which is stored in the transmission buffer, is stored in the Start Sequence Number field. Information expressing the state of the transmission buffer following the start sequence number in a bitmap format is stored in the Tx Buffer Bitmap Information field.

Figure 9:
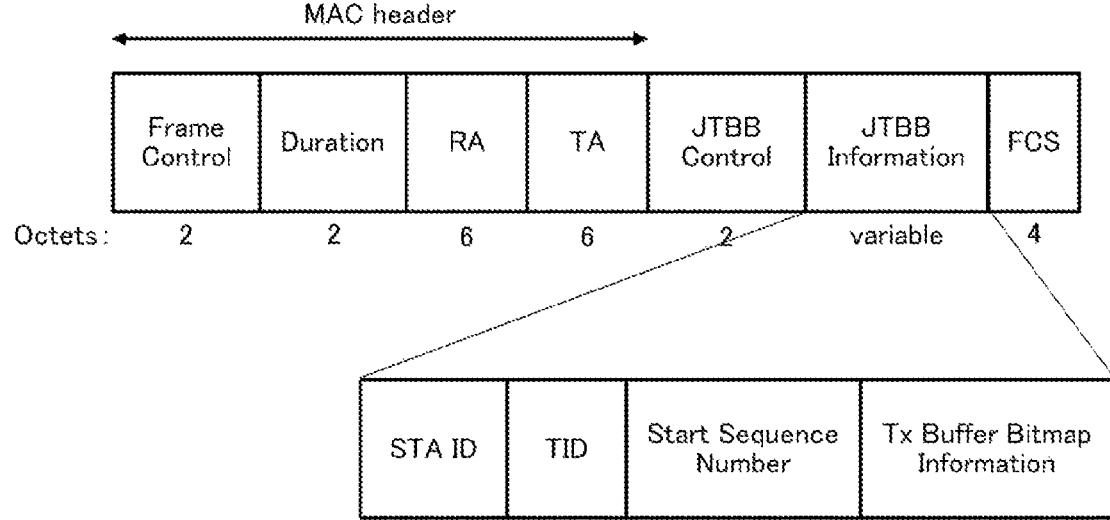
FIG. 9 is a diagram illustrating a configuration example of a Tx Buffer Update Request frame.

FIG. 9 illustrates a configuration example of the Tx Buffer Update Request frame used in the JTBB Setup phase. The Tx Buffer Update Request frame is a frame with which the master AP requests the other APs to update the transmission buffer, but has basically the same configuration as the JTBB Response frame illustrated in FIG. 8, and information indicating a frame type is indicated anywhere within the frame. For example, the frame type is indicated by the Frame Control field, the JTBB Control field, or the like.

The JTBB Information field of the Tx Buffer Update Request frame consists of STA ID, TID, Start Sequence Number, and Tx Buffer Bitmap Information. The identification information of the STA indicating the destination of the transmission buffer of which the updated is required, and the traffic is stored in the STA ID and TID fields. The start sequence number of the transmission buffer of which the update is requested is stored in the Start Sequence Number field. Information expressing update content of the transmission buffer following the start sequence number in a bitmap format is stored in the Tx Buffer Bitmap Information field.

E-1-4. Operation in JTBB Setup Phase

Figure 10:
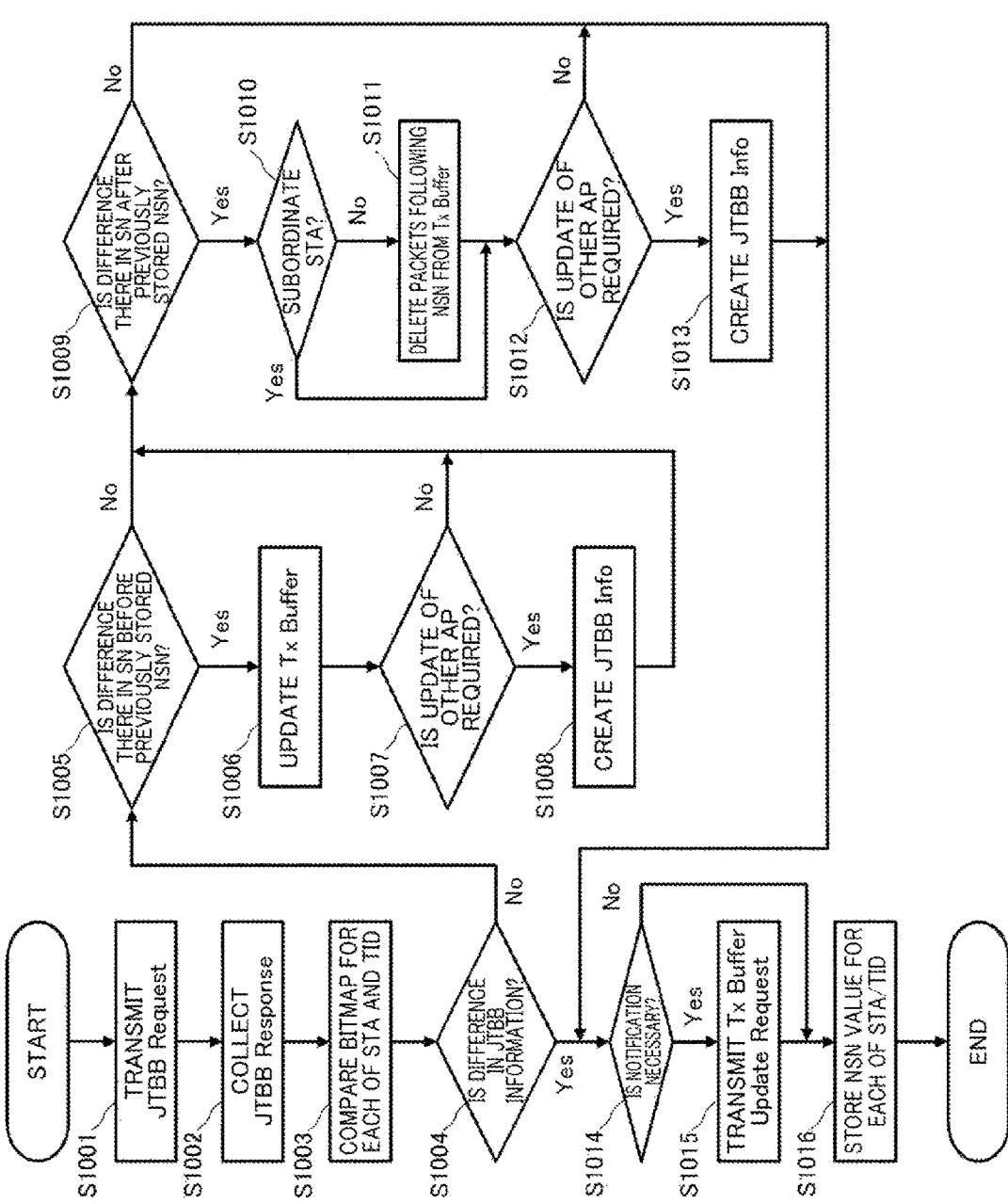
FIG. 10 is a flowchart illustrating an operation that is executed by a master AP.

FIG. 10 illustrates an operation that is executed by the master AP in the JTBB Setup phase in a flowchart format.

When the JTBB Setup starts, the master AP first transmits the JTBB Request frame to the non-master AP (step S1001), and receives the JTBB Response frame from the non-master AP (step S1002) to collect information related to the sequence number of the transmission buffer for each of the STA and the TID of the non-master AP, that is, JTBB.

Next, the master AP compares the JTBB information (Tx Buffer Bitmap Information) for each of the STA and the TID held by the respective APs (step S1003), and determines whether or not a difference is generated (step S1004).

When there is the difference in the JTBB information of any of the STAs and TIDs held by the respective APs (Yes in step S1004), the master AP further checks whether or not there is a difference in the sequence number before a next sequence number (NSN) previously stored (that is, previously checked) for the STA and TID (a value of a next sequence number assigned when a new packet addressed to the STA and TID arrives) (step S1005).

As illustrated in FIG. 4, when another AP has performed normal data transmission to its subordinate STA without performing cooperative transmission, a difference is generated in the sequence number before the previously stored NSN. When there is a difference in the sequence numbers before the previously stored NSN in this way (Yes in step S1005), the master AP updates the state of its own transmission buffer (information related to the sequence number of the transmission buffer of the STA) to be matched with the JTBB information of the connection destination AP of the STA (that is, an STA in which a difference is generated in JTBB) (step S1006).

In step S1006, for example, when the AP 101, which is the master AP, holds the packet with sequence number #2 addressed to the non-subordinate STA 112, whereas the AP 102, which is a connection destination of the STA 112, does not hold the packet, it is possible to determine that the packet has already been transmitted from the AP 102 to the STA 112. In this case, the AP 101, which is the master AP, deletes the packet from its own transmission buffer.

Next, the master AP determines whether the other APs also need to update the transmission buffers (step S1007). In step S1007, the master AP determines that the AP also needs to update the transmission buffer, when a difference is generated from the JTBB of the connection destination AP of the STA, with the sequence number before the NSN previously acquired from the AP other than the connection destination of the STA.

When other APs also need to update the transmission buffer (Yes in step S1007), the master AP creates JTBB Info for an update request and stores JTBB Info for an update request in the Tx Buffer Update Request frame (step S1008).

The JTBB Info of the Tx Buffer Update Request frame created in step S1008 includes the same information as the JTBB Info of the connection destination AP of the STA that is the destination of the packet. For example, when the AP 113 also holds the packet with sequence number #2 addressed to the STA 112 that the AP 101, which is the master AP, has deleted at the time of updating of the transmission buffer in step S1006, the AP 101 stores the JTBB Info addressed to the STA 112 held by the AP 102 in the Tx Buffer Update Request frame. Further, when the AP 102 or the AP 103 holds the packet addressed to the STA 111 that is not held by the AP 101 itself, which is the master AP, the AP 101 stores JTBB Info addressed to the STA 111 held by the AP 101 in the Tx Buffer Update Request frame.

The master AP performs the processing of steps S1005 to S1008 and transmits the Tx Buffer Update Request frame to other APs, making it possible to eliminate the difference in the transmission buffer caused by the sequence number before the NSN and avoid the stagnation in the transmission buffer of the packets that have been transmitted in the other AP due to the non-execution of the cooperative transmission in some APs in the group, as illustrated in FIG. 4.

Next, the master AP further checks whether or not a difference is generated in the sequence number following the previously stored NSN (step S1009). When a difference is generated in the sequence number after the previously stored NSN (Yes in step S1009), the master AP checks whether the STA that is the destination of the packet is a subordinate STA (step S1010).

When the STA that is the destination of the packet is not the subordinate STA (No in step S1010), the master AP deletes all packets following the NSN from its own transmission buffer (step S1011). This is because the master AP cannot determine which of the packets following the NSN has not been acquired. Even when a difference occurs in one sequence number, the master AP determines that the cooperative transmission is not possible for all packets whose sequence numbers are likely to differ.

In step S1009, for example, it is assumed that the AP 101, which is the master AP, has acquired up to the packet with sequence number #2 at the time of execution of the previous JTBB Setup phase in the JTBB Info addressed to the STA 112, and has acquired up to packets with sequence numbers #3 and #4 in the current JTBB Setup phase. However, when it has been found that the AP 102 that is the connection destination of the STA 112 has acquired up to the packets with sequence numbers #3 to #5, this means that the AP 101 has failed in acquisition of any one of the packets with the sequence numbers #3 to #5 acquired by the AP 102. Since a determination cannot be made as to which of packets cannot be acquired through management using only the MAC layer, the AP 101 also deletes the packets with the sequence numbers #3 and #4 addressed to the STA2 from its own transmission buffer. As will be described below, the NSN of the packet addressed to the STA 112 in this case is stored as #6.

Next, the master AP determines whether the other APs also need to update the transmission buffers (step S1012). In step S1012, the master AP determines that the AP also needs to update the transmission buffer, when a difference is generated from the JTBB of the connection destination AP of the STA, with the sequence number after the NSN previously acquired from the AP other than the connection destination of the STA.

When other APs also need to update the transmission buffer (Yes in step S1012), the master AP creates JTBB Info and stores JTBB Info in the Tx Buffer Update Request frame (step S1013).

For example, when a difference is generated between the JTBB addressed to the STA 112 held in the transmission buffer by the AP 103, which is not the connection destination of the STA 112, and the JTBB addressed to the STA 112 of the AP 102, which is the connection destination of the STA 112, cooperative transmission of the packet addressed to the STA 112 cannot be performed with the AP 103 added, it is necessary to delete the packet addressed to the STA 112 from the transmission buffer of the AP 103. Therefore, in step S1013, the master AP creates JTBB Info for instructing the AP 103 to delete the packet addressed to the STA 112, and stores the JTBB Info in the Tx Buffer Update Request frame.

The master AP performs the processing of steps S1009 to S1013 and transmits the Tx Buffer Update Request frame to the other APs, making it possible to remove the AP that has failed in acquisition of packets of a non-subordinate STA from members of cooperative transmission to the STA, and eliminate a difference in transmission packets among the cooperative transmission members as illustrated in FIG. 3 so that the STA can correctly acquire packets.

The master AP checks a difference in JTBBs of all STAs and TIDs and then determines whether it is necessary to notify other APs of the Tx Buffer Update Request frame (step S1014). When it is necessary to notify of the Tx Buffer Update Request frame (for example, when JTBB Info has been created in at least one of steps S1008 and S1013) (Yes in step S1014), the master AP transmits the Tx Buffer Update Request frame to the corresponding AP (step S1015). Finally, the master AP sets the NSN for each of the STA and the TID (step S1016), and ends the present processing.

When the master AP selects a cooperative candidate AP for each STA in advance, JTBB comparison in the flowchart illustrated in FIG. 10 may be performed only with the selected cooperative candidate AP. For example, when the STA 113 is away from the AP 101 that is the master AP and is out of a communication range, only JTBB Info of packets addressed to the STA 113 held by the AP 101 and the AP 102 may be compared so that a determination as to whether or not the transmission buffer is to be updated is made.

Figure 11:
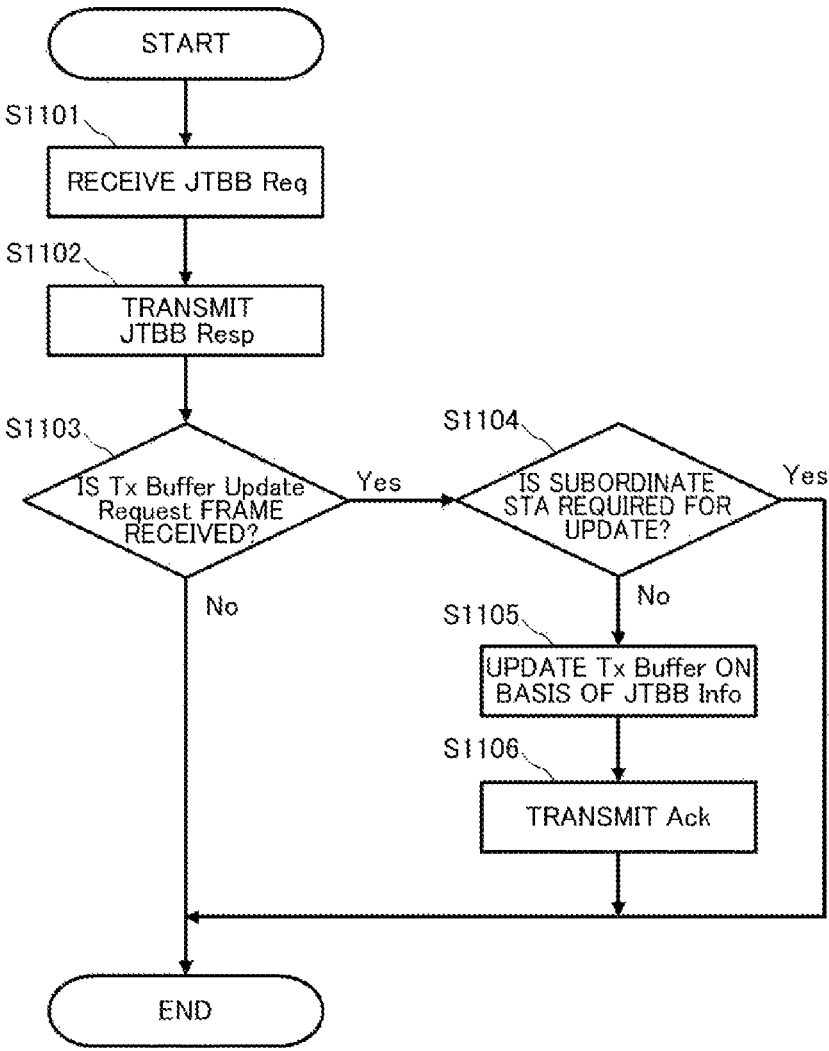
FIG. 11 is a flowchart illustrating an operation that is executed by a non-master AP.

FIG. 11 illustrates an operation that is executed by the non-master AP in the JTBB Setup phase in a flowchart format.

When the non-master AP receives the JTBB Request frame from the master AP (step S1101), the non-master AP generates the JTBB Response frame on the basis of the requested transmission buffer information and transmits the JTBB Response frame using resources indicated by the master AP (step S1102).

Thereafter, when the non-master AP receives the Tx Buffer Update Request frame from the master AP (Yes in step S1103), the non-master AP determines whether the destination of the transmission buffer requested to be updated in the frame is the subordinate STA (step S1104).

When the destination of the transmission buffer requested to be updated in the received Tx Buffer Update Request frame is the subordinate STA (Yes in step S1104), the non-master AP ends the present processing without perform- ing update of its own transmission buffer.

On the other hand, when the destination of the transmis- sion buffer requested to be updated in the received Tx Buffer Update Request frame is not the subordinate STA (No in step S1104), the non-master AP updates its own transmission buffer on the basis of the JTBB Info stored in the frame (step S1105), returns an Ack frame to the master AP (step S1106), and ends the present processing.

When the non-master AP does not hold packets addressed to the STA and TID of which the update has been required by the JTBB Request frame from the master AP at all, the non-master AP does not need to perform update of the transmission buffer in step S1105, and may set content of the Tx Buffer Bitmap Info to "0" and return an Ack frame to the master AP, or may not transmit the JTBB Response frame in step S1106.

E-1-5. JTX Phase

Figure 12:
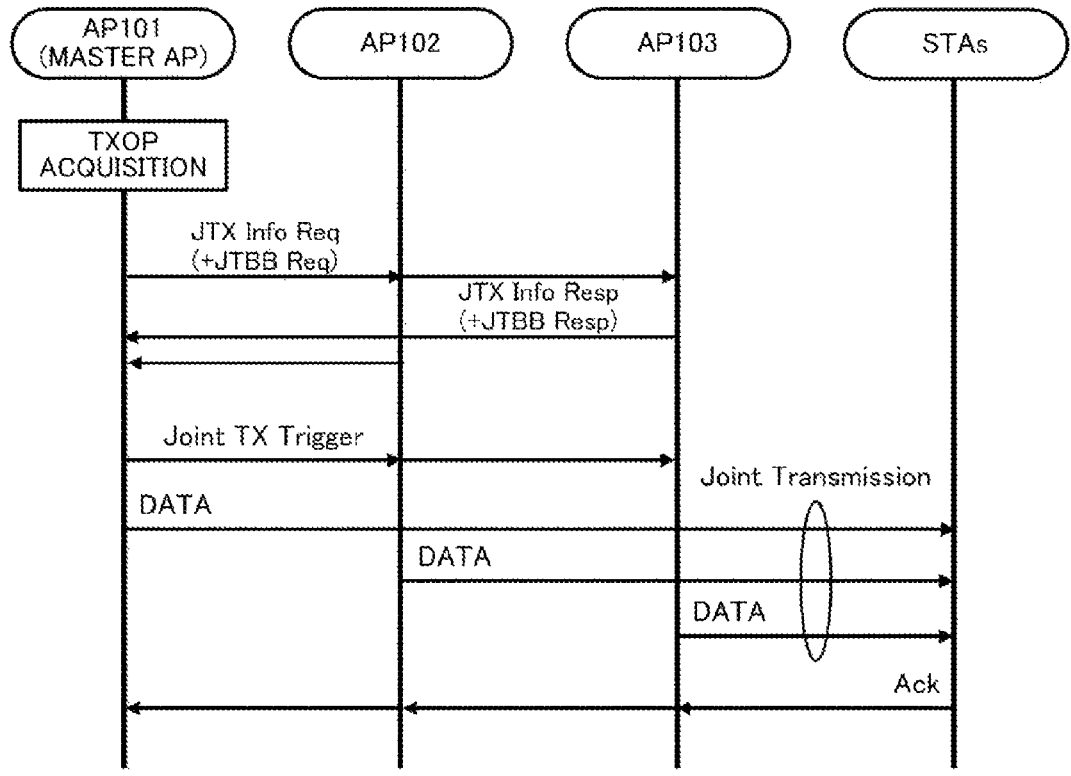
FIG. 12 is a diagram illustrating a detailed communication sequence example in a JTX phase when the master AP acquires a transmission right.

FIG. 12 illustrates a detailed communication sequence example of the JTX phase when the master AP (the AP 101) acquires the transmission right (TXOP) in the system 100 illustrated in FIG. 1.

AP 101, which is the master AP, transmits a JTX Info Request frame to the AP 102 and the AP 103, which are non-master APs, and acquires a JTX Info Response frame from each of the AP 102 and the AP 103.

Thereafter, the AP 101 determines which AP performs cooperative transmission to a certain STA, on the basis of the information collected from each of the AP 102 and the AP 103. After the AP 101 transmits a Joint Tx Trigger frame to the AP 102 and the AP 103 requesting cooperative trans- mission on the basis of a result of the determination, the APs 101 to 103 start data transmission according to Joint Tx.

In the communication sequence example illustrated in FIG. 12, although all the APs 101 to 103 perform Joint Tx, Joint Tx by two apparatuses including the master AP may be performed depending on a situation or only the master AP may perform the data transmission. When only the master AP performs data transmission, the data transmission is started as it is without transmission of the Joint Tx Trigger frame to other APs.

Further, although in FIG. 12, a communication sequence example in which the collection of the JTBB Info (that is, the information on the transmission buffer of each AP) is performed, as in the JTBB Setup phase, through exchange of the JTX Info Request and the JTX Info Response between the master AP and the non-master AP is shown, the collec- tion of the JTBB Info may not be performed through the exchange of the JTX Info Request and the JTX Info Response in the JTX phase when the JTBB Info has been collected in the JTBB Setup phase.

Figure 13:
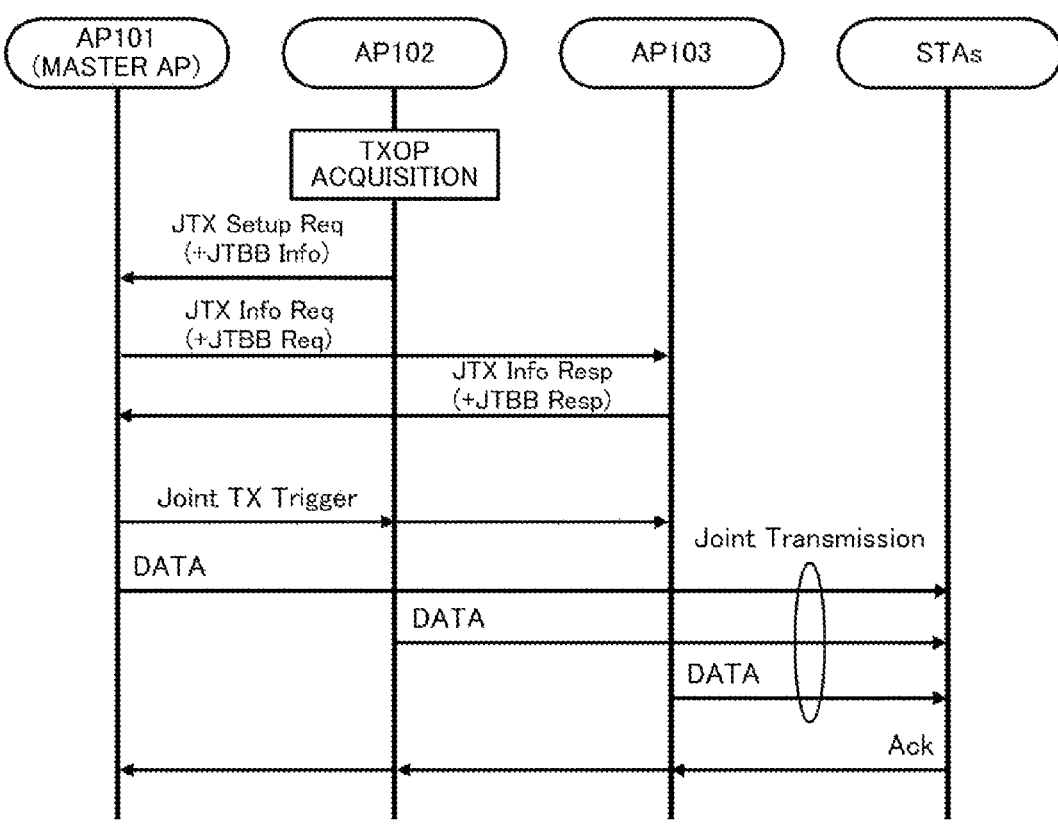
FIG. 13 is a diagram illustrating a detailed communication sequence example in a JTX phase when the non-master AP acquires a transmission right.

FIG. 13 illustrates a detailed communication sequence example of the JTX phase when a non-master AP (the AP 102 in the example illustrated in FIG. 13) acquires the transmission right.

The AP 102, which is a non-master AP, first transmits a JTX Setup Request frame to the AP 101, which is a master AP. The AP 101, which is a master AP, transmits the JTX Info Request frame to a non-master AP (the AP 103 in the example illustrated in FIG. 13) other than the AP 102, and acquires the JTX Info Response frame from the AP 103.

Thereafter, the AP 101 determines whether a certain AP performs the cooperative transmission to a certain STA on the basis of information collected from each of the AP 102 and the AP 103. After the AP 101 transmits a Joint Tx Trigger frame to the AP 102 and the AP 103 requesting the cooperative transmission on the basis of a determination result, the APs 101 to 103 start data transmission according to Joint Tx.

In FIG. 13, all the APs 101 to 103 perform Joint Tx, but depending on the situation, Joint Tx may be performed by two apparatuses including the AP 102, or only the AP 102 that has acquired the transmission right may perform data transmission. When only the AP 102 performs data trans- mission, this means that information for permitting only the AP 102 to perform data transmission in a Joint Tx Trigger frame has been assigned from the master AP.

Further, in FIG. 13, a communication sequence example in which collection of JTBB Info (that is, information on the transmission buffer of each AP) is performed, as in the JTBB Setup phase, through exchange of the JTX Info Request and the JTX Info Response between the master AP and the non-master AP is illustrated, but when the JTBB Info has already been collected in the JTBB Setup phase, the collec- tion of the JTBB Info may not be performed through exchange of the JTX Info Request and the JTX Info Response in the JTX phase.

E-1-6. Frame Configuration Example

This section describes a configuration of a frame used in the JTX phase.

Figure 14:
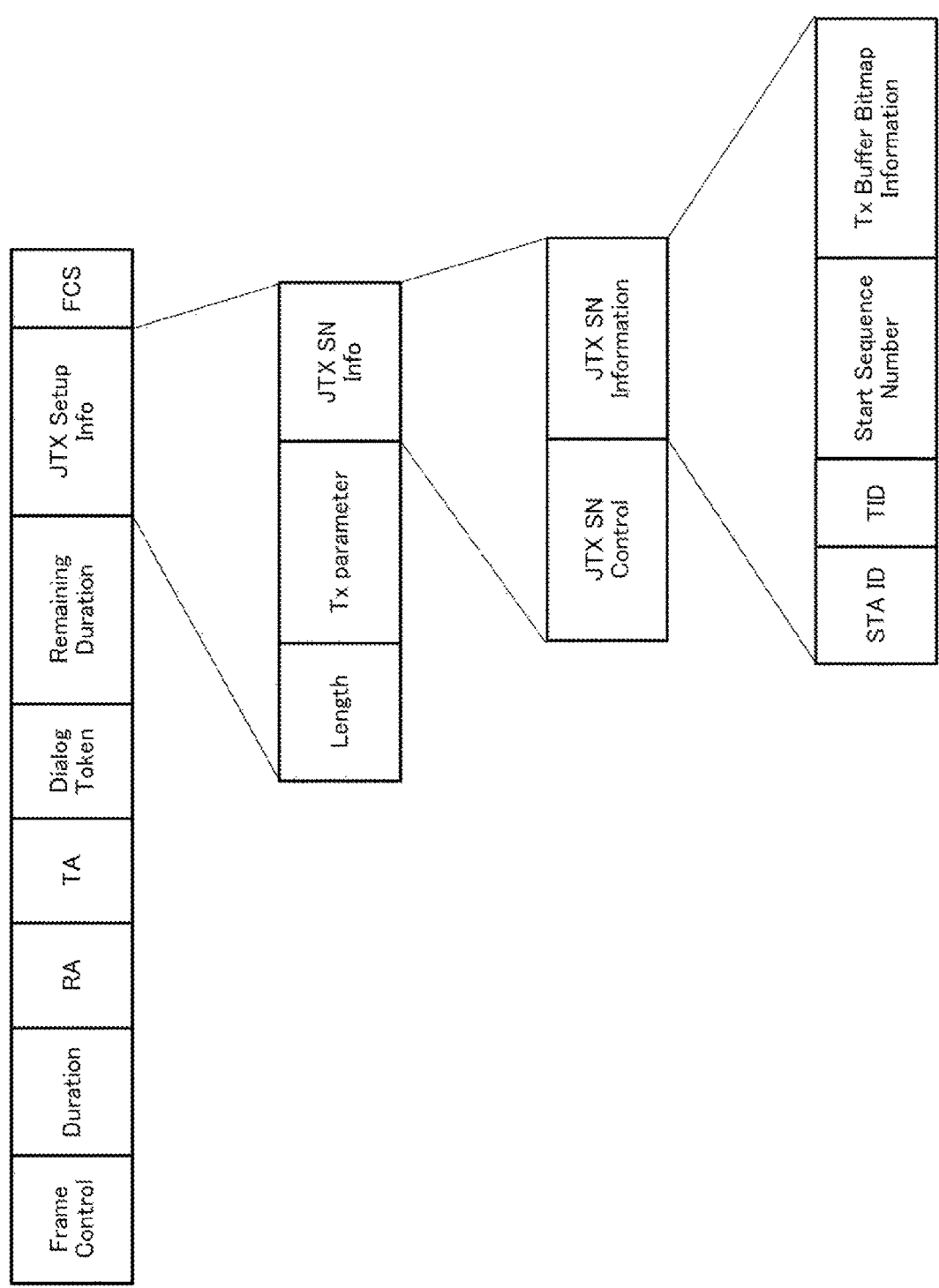
FIG. 14 is a diagram illustrating a configuration example of a JTX Setup Request frame.
Figure 15:
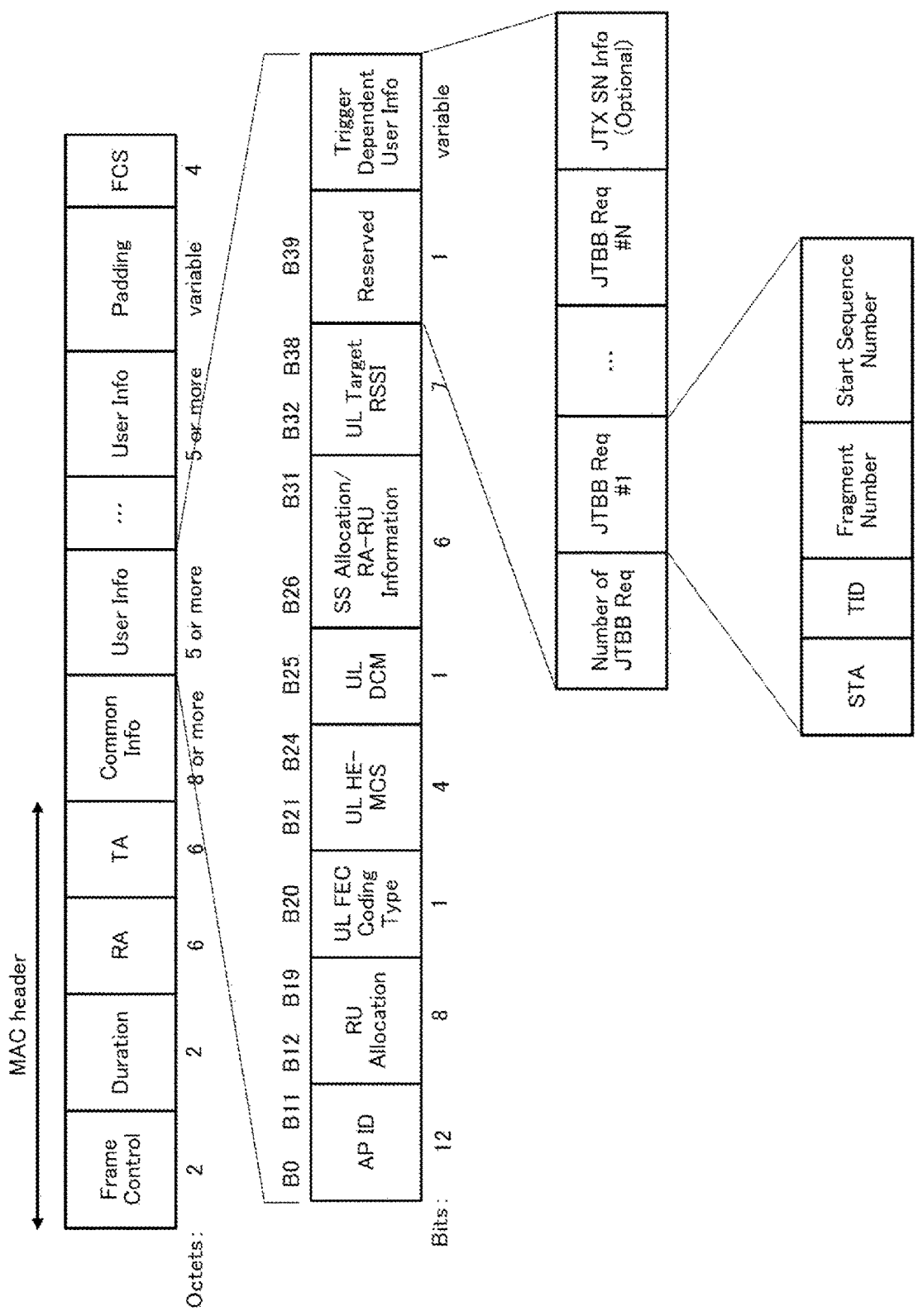
FIG. 15 is a diagram illustrating a configuration example of a JTX Info Request frame.
Figure 16:
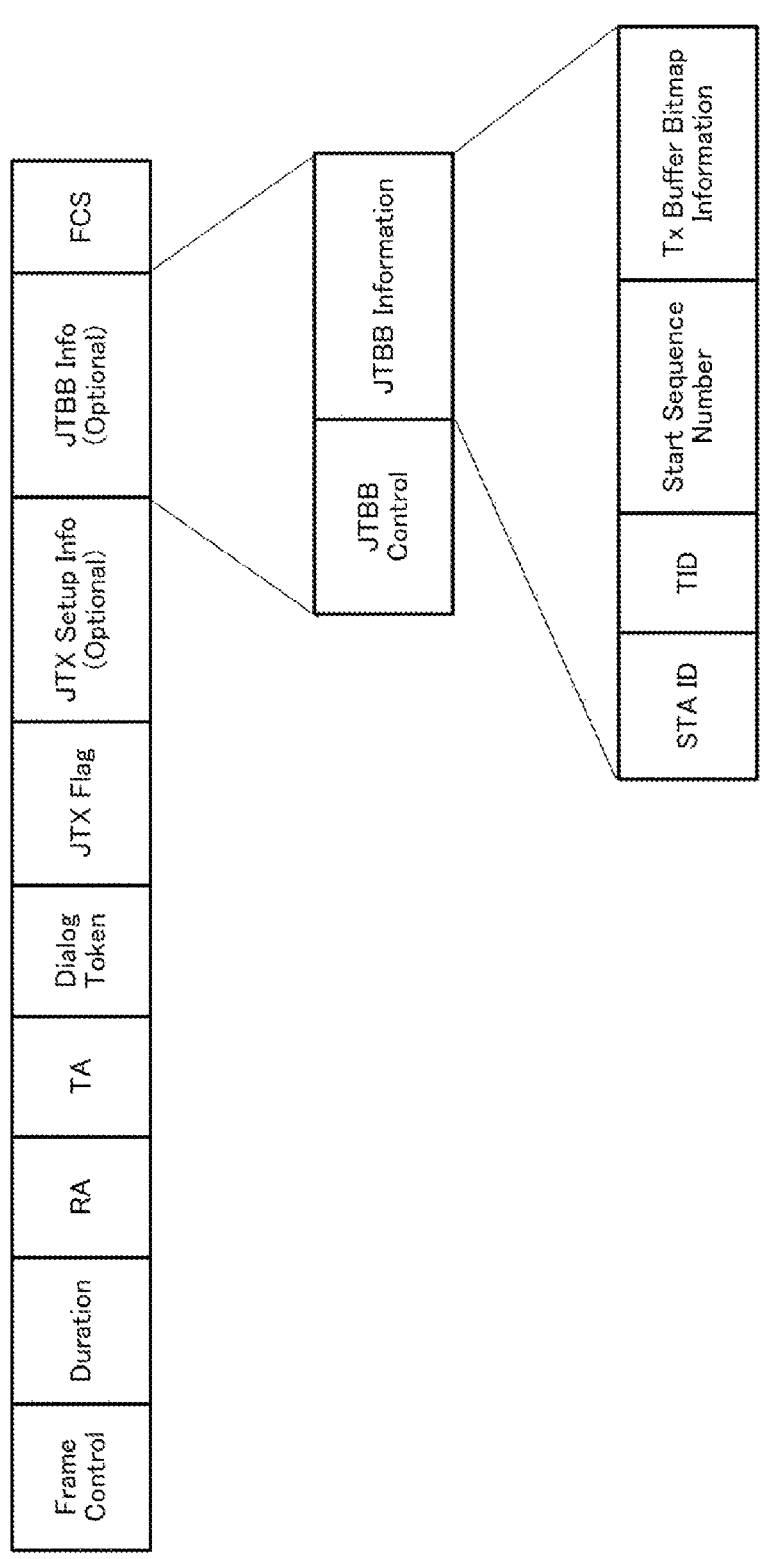
FIG. 16 is a diagram illustrating a configuration example of a JTX Info Response frame.
Figure 17:
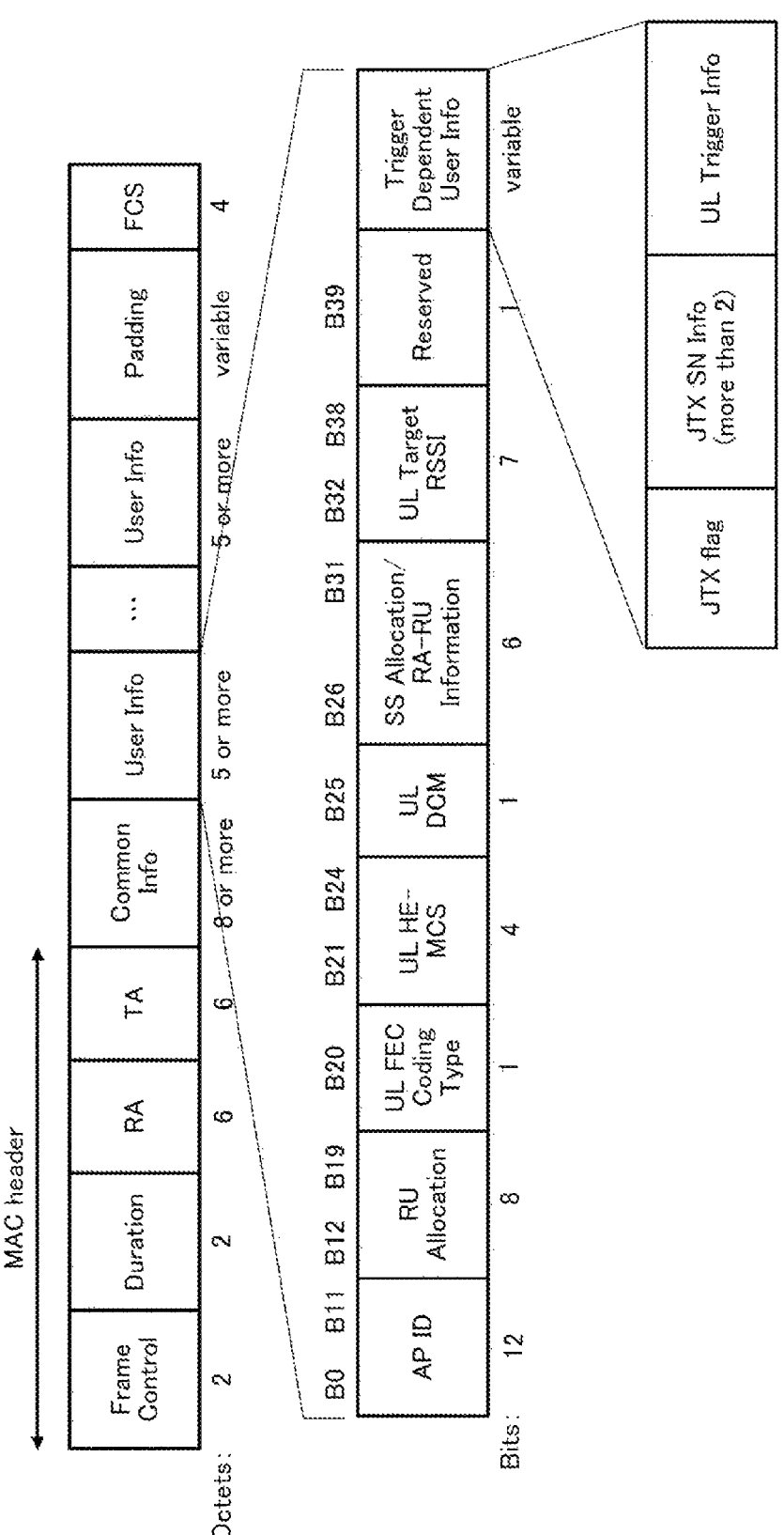
FIG. 17 is a diagram illustrating a configuration example of a Joint Tx Trigger frame.

FIG. 14 illustrates a configuration example of the JTX Setup Request frame used in the JTX phase. The JTX Setup Request frame is a frame used when a non-master AP that has acquired the transmission right requests the master AP to perform cooperative transmission. The illustrated JTX Setup Request frame is configured on the basis of the Action frame of IEEE 802.11-2016, but a configuration and a variable name of the frame are not particularly limited as long as information on each of the following Remaining Duration and JTX Setup Info is included.

Information indicating a remaining time of the acquired transmission right is stored in the Remaining Duration field.

A data length (Length) desired to be transmitted by the AP that has acquired the transmission right, a transmission parameter (Tx Parameter), and sequence number informa- tion (JTX SN Info) of a packet desired to be transmitted are stored in the JTX Setup Info field. Examples of the trans- mission parameter may include a modulation and coding scheme (MCS) and an encoding method. Further, the JTX SN Info includes fields of JTX SN Control and JTX SN Information, like the JTBB Info.

Information on a JTBB Info expression method, such as Multi-TID or Compressed, is stored in the JTX SN Control field. Further, the JTX SN Information field consists of STA ID, TID, Start Sequence Number, and Tx Buffer Bitmap Information. Identification information of each of the destination STA requesting cooperative transmission and the traffic is stored in the STA ID and TID fields. The start sequence number of the transmission buffer stored in the JTBB Info field is stored in the Start Sequence Number field. Information expressing the state of the transmission buffer following the start sequence number in a bitmap format is stored in the Tx Buffer Bitmap Information field.

FIG. 15 illustrates a configuration example of the JTX Info Request frame used in the JTX phase. The illustrated JTX Info Request frame is configured on the basis of the Trigger frame of the IEEE 802.11ax, but a configuration and a variable name of the frame are not particularly limited as long as information on JTX SN Info is included. JTX SN Info consists of fields of STA ID, TID, Start Sequence Number, and Tx Buffer Bitmap Information.

The JTX Info Request frame illustrated in FIG. 15 basically has the same frame configuration as the JTBB Request frame illustrated in FIG. 7, but the JTX SN Info field may not be assigned to Optional, that is, the JTX Info Request frame. As also illustrated in FIG. 14, the JTX SN Info field includes respective fields of JTX SN Control and JTX SN Information.

FIG. 16 illustrates a configuration example of the JTX Info Response frame used in the JTX phase. The illustrated JTX Info Response frame is configured on the basis of the Action frame of IEEE 802.11-2016, but a configuration and a variable name of the frame are not particularly limited as long as each of the following JTX Flag, JTX Setup Info, and JTBB Info information is included.

Information indicating whether or not the AP returning the frame can perform Joint Tx is stored in the JTX Flag field.

Information on data that the AP returning the frame desires to transmit is stored in the JTX Setup Info field. For example, a data length (Length), a transmission parameter (Tx Parameter), and information indicating the sequence number (JTX SN Info) of the packet to be transmitted are stored. However, the JTX Setup Info field is optional and may be omitted.

The JTBB Info field includes fields of JTBB Control and JTBB Information. Information on a JTBB Info expression method, such as Multi-TID or Compressed is stored in the JTBB Control field. The JTBB Information field consists of STA ID, TID, Start Sequence Number, and Tx Buffer Bitmap Information. The identification information of each of the STA and the traffic is stored in the STA ID and TID fields. The start sequence number of the packet stored in the transmission buffer is stored in the Start Sequence Number field. Information expressing the state of the transmission buffer following the start sequence number in a bitmap format is stored in the Tx Buffer Bitmap Information field. However, the JTBB Info field is optional and may be omitted.

FIG. 17 illustrates a configuration example of the Joint Tx Trigger frame used in the JTX phase. The illustrated JTX Tx Trigger frame is configured on the basis of the Trigger frame of the IEEE 802.11ax, but a configuration and variable of the frame are not particularly limited as long as information on each of the following JTX flag, JTX SN Info, and UL Trigger Info is included.

Flag information indicating whether or not Joint Tx is to be performed on the packet designated in the subsequent JTX SN Info field field is stored in the JTX flag field. JTX flag==1 indicates execution of Joint TX, JTX flag==0 indicates non-execution of Joint TX (the normal data transmission).

Information for designating a packet for which Joint Tx is to be performed is stored in the JTX SN Info field. The JTX SN Info field includes, for example, fields of STA ID, TID, and Start Sequence Number (not illustrated in FIG. 17). Identification information of each of the destination STA of the packet to be subjected to Joint Tx and the traffic is stored in the STA ID and TID fields. Further, the start sequence number of the packet to be transmitted to the destination is stored in the Start Sequence Number field.

Trigger frame information for a response signal is stored in a UL Trigger Info field. For this information, each AP stores information between a PHY header and a concatenated transmission packet at the time of execution of Joint Tx, and designates resources for Ack transmission from the STA.

In the frame configuration example illustrated in FIG. 17, although information of each of JTX flag, JTX SN Info, and UL Trigger Info is included in the User Info field, the information may be included in, for example, another field such as a Trigger Dependent field in a Common Info field.

E-1-7. Operation in JTX Phase

FIG. 18 illustrates an operation that the master AP executes when acquiring the transmission right in a flowchart format.

When the master AP acquires the transmission right (TXOP) (Yes in step S1801), the master AP transmits the JTX Info Request frame to one or more cooperative candidate APs (step S1802), and collects the JTX Info Response frame from the cooperative candidate APs (step S1803).

The master AP determines whether Joint Tx can be performed on the basis of the information collected in step S1802 (step S1804).

When the master AP determines that Joint Tx can be performed (Yes in step S1804), the master AP transmits a Joint Tx Trigger frame in which JTX flag==1 has been set, to one or more APs (step S1805), and starts Joint Tx with the AP (step S1806).

On the other hand, when the master AP determines that Joint Tx cannot be performed (No in step S1804), the master AP does not perform cooperative transmission and starts the normal data transmission (step S1807).

Here, in step S1804, the master AP may determine that Joint Tx can be performed, for example, when the following conditions (1) to (3) are all satisfied.

(1) There is a JTX Info Response frame response from one or more candidate APs, or a channel state of at least one of the candidate APs is an idle state.

(2) The candidate AP satisfying the condition (1) holds at least one (or all) packet that the master AP itself desires to transmit.

(3) Information on a channel measurement result or transmission weight for test signals transmitted from the master AP itself and the candidate AP satisfying the condition (1) in the Sounding phase is received from the STA that is the destination of the packet satisfying the condition (2).

Further, the master AP collects JTX SN Info desired to be transmitted, from the candidate AP, and the following two conditions (4) and (5) are added, in addition to the above conditions (1) to (3).

(4) The master AP holds at least one (or all) packet that the candidate AP satisfying the conditions (1) and (2) desires to transmit.

(5) Information on a channel measurement result or transmission weight for test signals transmitted from the master AP itself and the candidate AP satisfying the condition (1) in the Sounding phase is received from the STA that is the destination of the packet satisfying the condition (4).

However, the (2) above is confirmed on the basis of the latest JTBB Info or JTX SN Info collected in the JTBB Setup phase, exchange of the JTX Info Request frame and the JTX Info Response frame, or the like.

Further, the master AP may determine or reselect the packets that the master AP transmits on the basis of the collected information. That is, the master AP may determine STAs or packets satisfying the conditions (2) to (5) before transmitting the Joint Tx Trigger frame.

Figure 19:
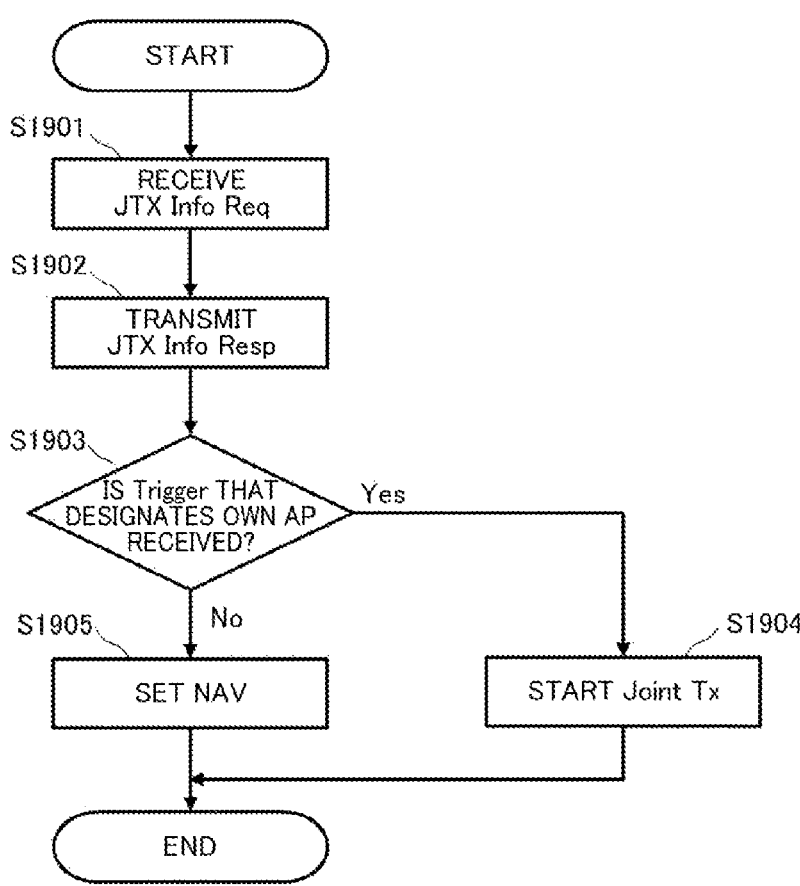
FIG. 19 is a flowchart illustrating an operation that the non-master AP executes when transmission right is shared from a master AP.

FIG. 19 illustrates an operation that is executed by the non-master AP when the master AP acquires the transmission right, which is shared with the non-master APs in a flowchart format.

When the non-master AP receives the JTX Info Request frame from the master AP (step S1901), the non-master AP returns the JTX Info Response frame including information on its own transmission buffer to the master AP (step S1902).

When the non-master AP receives the Joint Tx Trigger frame including its own AP ID from the master AP (Yes in step S1903), the non-master AP starts Joint Tx with the master AP (step S1904).

On the other hand, when the non-master AP does not receive the Joint Tx Trigger frame including its own AP ID from the master AP, or when its own AP ID is not included in the Joint Tx Trigger frame received from the master AP (No in step S1903), the non-master AP sets a transmission waiting time (NAV: Network Allocation Vector) (step S1905), and ends the present processing.

Further, when the non-master AP receives the JTX Info Request frame, the non-master AP may not return the JTX Info Response frame when the channel state is a busy state and data transmission is not performed or when it is found that the master AP does not hold packets desired to be transmitted, or may notify the master AP of its own situation using the JTX Info Response frame.

Figure 20:
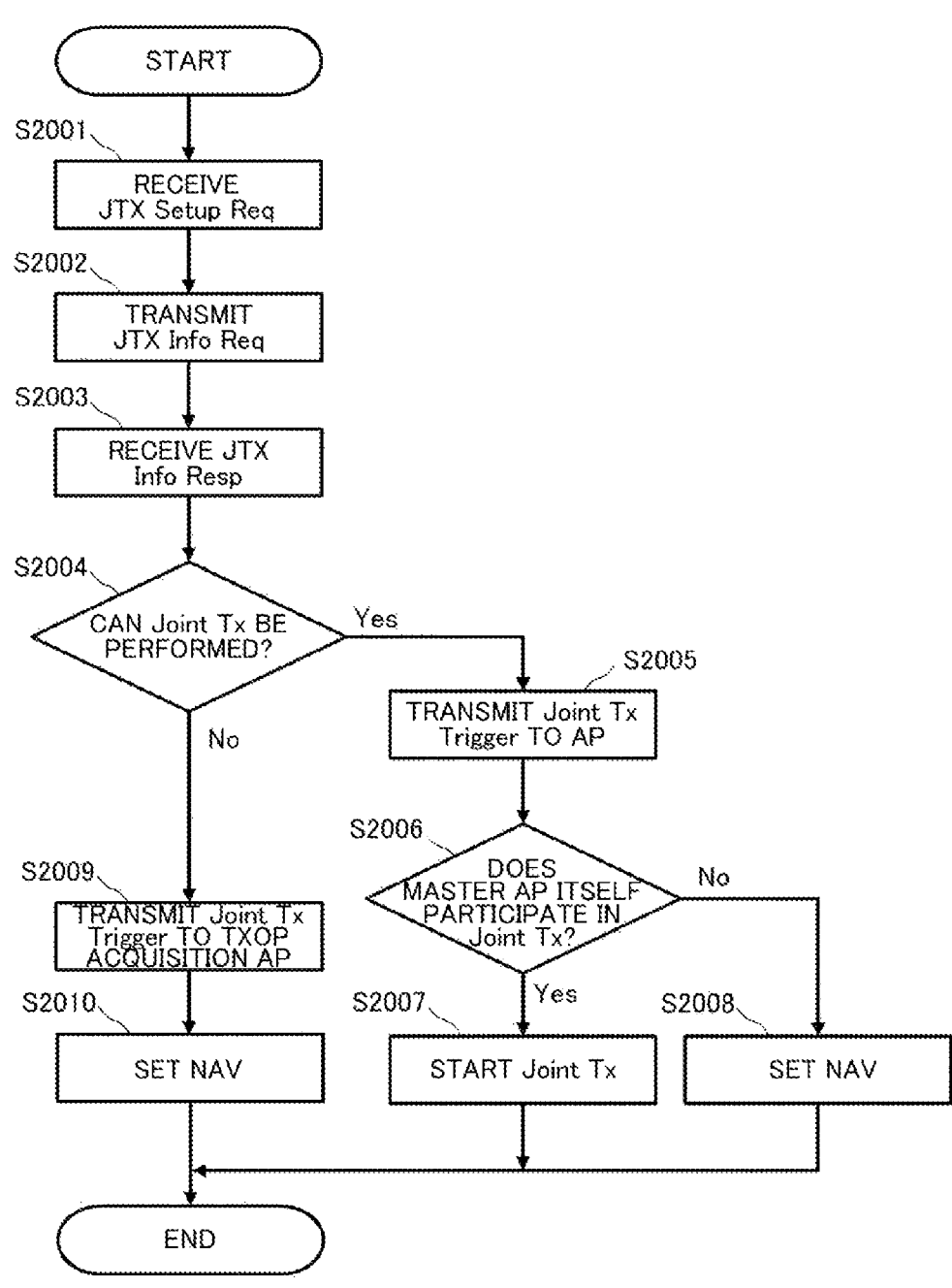
FIG. 20 is a flowchart illustrating an operation that the master AP executes when the transmission right is shared by the non-master AP.

FIG. 20 illustrates an operation that the master AP executes when the transmission right is shared with the non-master AP in a flowchart format.

When the master AP receives the JTX Setup Request frame from the non-master AP that has acquired the transmission right (step S2001), the master AP transmits the JTX Info Request frame to the other non-master AP (step S2002).

Figure 18:
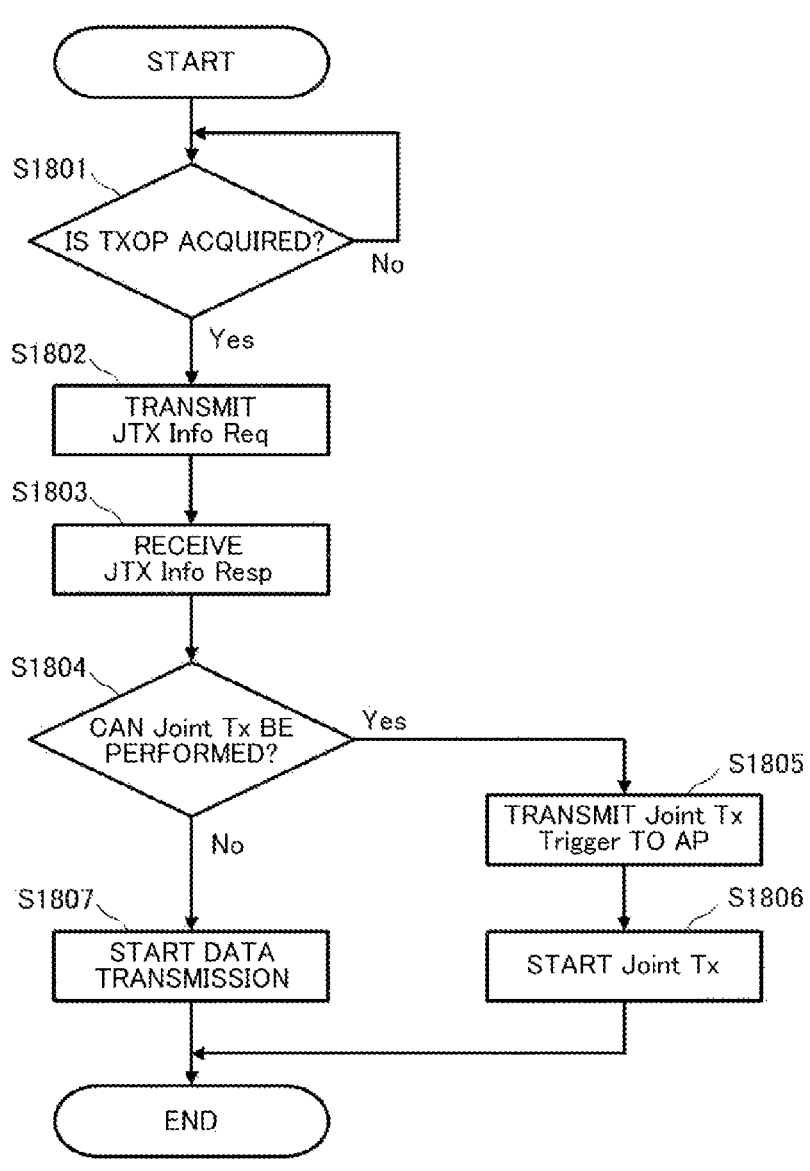
FIG. 18 is a flowchart illustrating an operation that the master AP executes when the master AP acquires the transmission right.

Thereafter, when the master AP receives the JTX Info Response frame from the other non-master AP (step S1903), the master AP determines whether or not the Joint Tx can be performed on the basis of the information of the transmission buffer of the non-master AP collected from the JTX Setup Request frame and the JTX Info Response frame (step S2004). This determination condition may be the same as the condition in step S1804 in the flowchart illustrated in FIG. 18.

When the master AP determines that Joint Tx can be performed (Yes in step S2004), the master AP transmits the Joint Tx Trigger frame in which JTX flag==1 has been set, to one or more APs including the non-master AP, which have acquired the transmission right (step S2005). Further, the master AP itself determines whether or not to participate in Joint Tx (step S2006).

When the master AP itself also participates in Joint Tx (Yes in step S2006), Joint Tx with the AP is started (step S2007). On the other hand, when the master AP itself does not participate in Joint Tx (No in step S2006), the master AP transmits the Joint Tx Trigger frame and then sets a transmission waiting time (NAV) until at least Joint Tx ends (step S2008), and the present processing ends.

Further, when the master AP determines that Joint Tx cannot be performed (No in step S2004), the master AP transmits a Joint Tx Trigger frame in which JTX flag==0 has been set to the non-master AP that has acquired the transmission right (step S2009), and then sets the transmission waiting time (NAV) until at least the data transmission of the non-master AP that has acquired the transmission right ends (step S2010), and ends the present processing.

Effects of exchange of the JTX Info Request frame and the JTX Info Response frame are limited when there are two or more non-master APs. Therefore, when there is only one non-master AP (that is, targets of Joint Tx are only the master AP, and the non-master AP that has acquired the transmission right), processing steps S2002 and S2003 of exchanging the JTX Info Request frame and the JTX Info Response frame may be skipped.

Figure 21:
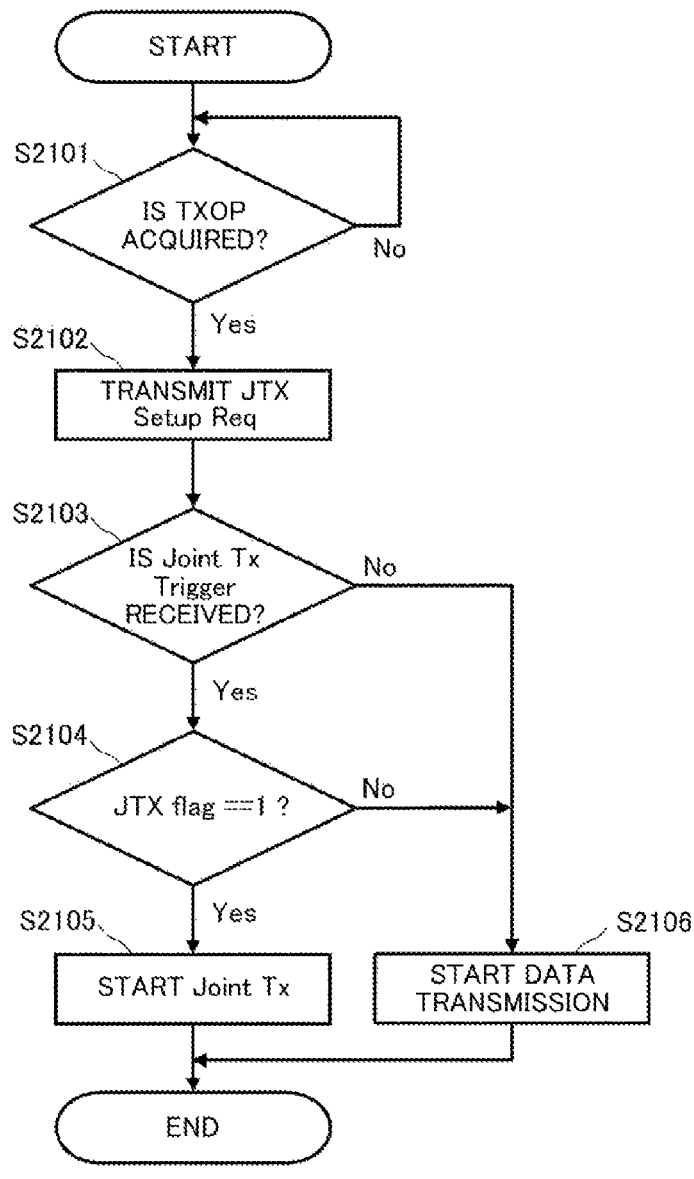
FIG. 21 is a flowchart illustrating an operation that the non-master AP executes when the non-master AP acquires the transmission right.

FIG. 21 illustrates an operation performed when a non-master AP has acquired the transmission right in a flowchart format.

When the non-master AP acquires the transmission right (Yes in step S2101), the non-master AP transmits the JTX Setup Request frame to the master AP (step S2102).

Thereafter, when the non-master AP receives the Joint Tx Trigger frame from the master AP (Yes in step S2103), the non-master AP checks whether the JTX flag==1 has been set. When the JTX flag==1 has been set (Yes in step S2104), the non-master AP starts Joint Tx after receiving the Joint Tx Trigger frame (step S2105).

On the other hand, when the Joint Tx Trigger frame is not received from the master AP (No in step S2103) or when the Joint Tx Trigger frame has been received from the master AP (Yes in step S2103) and JTX flag==0 has been set (No in step S2104), the non-master AP starts data transmission to the subordinate STAs without cooperating with other APs (step S2106).

Although FIGS. 18 to 21 illustrate examples of an operation when the AP acquires the transmission right, exchange of other control frames such as request to send/clear to send (RTS/CTS) may be performed before each of operations illustrated in FIGS. 18 to 21 is started. Further, when data transmission is performed again within the same transmission right, the AP may perform, again, processing such as sharing of information of the transmission buffer or determination as to whether Joint Tx can be performed, or may skip some processing. For example, when the AP starts data transmission without performing cooperative transmission in first transmission when the AP has acquired the transmission right, second and subsequent data transmissions within the same transmission right may be started without transmission of a JTX Setup frame.

E-1-8. Effects

This section describes the effects obtained by sharing information related to the sequence number of each packet in the transmission buffer among the APs according to the first embodiment of the present disclosure.

Figure 22:
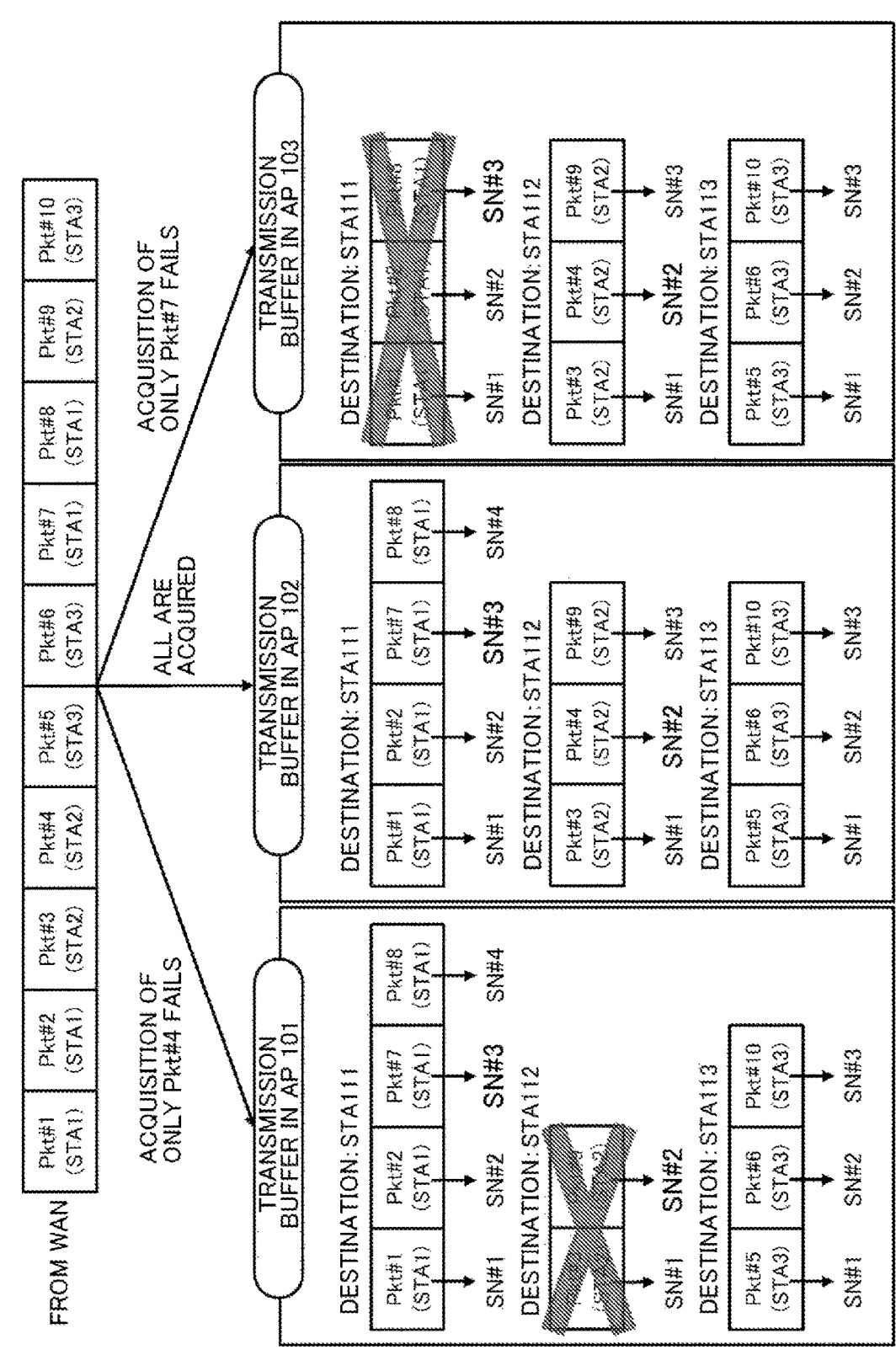
FIG. 22 is a diagram illustrating an example (first embodiment) in which each AP manages packets acquired in a random order from a backhaul.

In FIG. 22, an example in which each of the APs 101 to 103 acquires the 10 packets (Pkt) #1 to #10 addressed to the STAs 111 to 113 from the backhaul 120 in a random order, and assigns a sequence number to each of the STA and the TID to manage the packets is illustrated. Here, in FIG. 22, it is assumed that the same TID is assigned to all packets for the sake of simplicity of description.

When each of the APs 101 to 103 acquires packets #1 to #10 addressed to the STAs 111 to 113 from the backhaul 120 in a random order, packets #1 to #10 are transmitted to the wireless signal processing unit 220 in each of the APs 101 to 103, assigned with a MAC header and error detection code, and then, stored in the communication storage unit 222 until the transmission right is acquired. Here, when a difference is generated in the packets acquired from the backhaul 120 among the APs 101 to 103, this means that different packets are indicated by the same sequence number. Even when Joint Tx is performed as it is, cooperative transmission of different packets is performed among the APs 101 to 103, and the STA on the receiving side cannot correctly acquire a signal (to be described above).

In the example illustrated in FIG. 22, since the AP 101 has failed in acquisition of packet #4, one packet addressed to the STA 112 is missing when compared with the AP 102 and the AP 103. Further, since the AP 103 has failed in acquisition of packet #7, one packet addressed to the STA 111 is missing when compared with the AP 101 and the AP 102.

In the first embodiment of the present disclosure, before Joint Tx is performed, the master AP collects the JTBB information from each AP through the JTBB Setup phase or the exchange of the JTX Info Request frame and the JTX Info Response frame, and performs update of the transmission buffer of each AP.

In the example illustrated in FIG. 22, in a case in which the AP 101, which is the master AP, detects that a difference is generated in the sequence numbers of packets addressed to the subordinate STA 112 of the AP 102 (the AP 101 holds up to the packet with sequence number #2, whereas the AP 102 holds up to the packet sequence number #3) when the AP 101 has collected the JTBB information, the AP 101 deletes packets addressed to the STA 112 (all newly acquired packets) from its own transmission buffer. As a result, when Joint Tx for the STA 112 is performed, there are two options: the AP 101 does not participate and the AP 102 and the AP 103 perform Joint Tx, and the AP 102 alone performs the data transmission.

Further, in the example illustrated in FIG. 22, when the AP 101, which is the master AP, collects the JTBB information, and detects that a difference is generated in the sequence numbers of packets addressed to the subordinate STA 111 of the AP 101 (the AP 101 has up to the packet with sequence number #4, whereas the AP 103 only holds up to the packet with sequence number #3), the AP 101 requests the AP 103 to delete the packet (all newly acquired packets) addressed to the STA 111 from the transmission buffer. As a result, when Joint Tx for the STA 111 is performed, there are two options: the AP 103 does not participate and the AP 101 and the AP 102 perform Joint Tx, and the AP 101 alone performs the data transmission.

In the first embodiment of the present disclosure, the processing illustrated in FIG. 22 is performed before Joint Tx is performed, making it possible to prevent a case in which the different packets are subjected to cooperative processing and are transmitted through Joint Tx.

Figure 23:
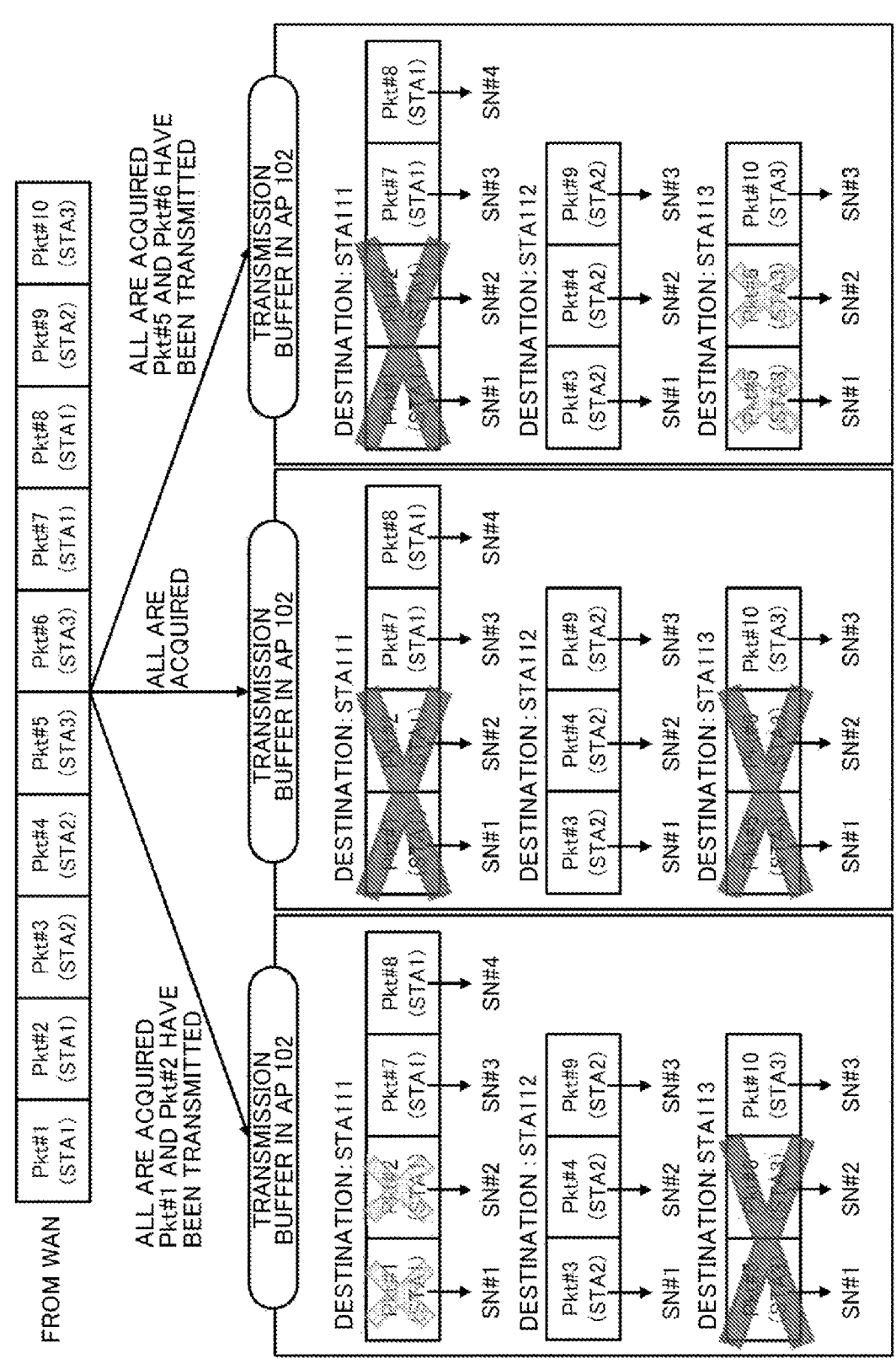
FIG. 23 is a diagram illustrating another example (first embodiment) in which each AP manages the packets acquired in the random order from the backhaul.

In FIG. 23, an example in which each of the APs 101 to 103 acquires the 10 packets (Pkt) #1 to #10 addressed to the STAs 111 to 113 from the backhaul 120 in a random order, and assigns a sequence number to each of the STA and the TID to manage the packets is illustrated. Here, in FIG. 23, it is assumed that the same TID is assigned to all packets for the sake of simplicity of description.

In the example illustrated in FIG. 23, it is assumed that each of the APs 101 to 103 has normally acquired all packets (Pkt) #1 to #10 from the backhaul 120 via the WAN. Here, for example, it is assumed that a certain AP does not perform cooperative transmission with other APs and performs data transmission to its subordinate STA depending on operation modes of the AP. In the example illustrated in FIG. 23, the AP 101 transmits packet #1 (SN #1) and packet #2 (SN #2) addressed to the subordinate STA 111 without cooperating with other APs, and deletes these packets from the transmission buffer when receiving a response signal (Ack) from the STA 111. Further, the AP 103 transmits packet #5 (SN #1) and packet #6 (SN #2) addressed to the subordinate STA 113 without cooperation with the other APs, and removes these packets from the transmission buffer when receiving a response signal (Ack) from the STA 113.

In the first embodiment of the present disclosure, before Joint Tx is performed, the master AP collects the JTBB information from each AP through the JTBB Setup phase or the exchange of the JTX Info Request frame and the JTX Info Response frame, and performs update of the transmission buffer of each AP.

In the example illustrated in FIG. 23, the AP 101, which is the master AP, transmits packet #1 (SN #1) and packet #2 (SN #2) addressed to the subordinate STA 111 without cooperating with other APs, and deletes these packets from the transmission buffer when receiving the response signal (Ack) from the STA 111, but it is possible to detect that these packets remain in the transmission buffers of the AP 102 and the AP 103 that share the JTBB information. The AP 101 requests the AP 102 and the AP 103 to delete packet #1 (SN #1) and packet #2 (SN #2) addressed to the STA 111 (with sequence numbers before the previously stored NSN).

Further, in the example illustrated in FIG. 23, the AP 103 transmits packet #5 (SN #1) and packet #6 (SN #2) addressed to the subordinate STA 113 without cooperation with the other APs, and removes these packets from the transmission buffer when receiving a response signal (Ack) from the STA 113. When the AP 101, which is the master AP, detects that packet #5 (SN #1) and packet #6 (SN #2) addressed to the STA 113 have been deleted from the transmission buffer of the AP 103 on the basis of the shared JTBB information, the AP 101 deletes these packets (with sequence numbers before the previously stored NSN) from its own transmission buffer and requests the AP 102 to delete these packets. By performing such processing, it becomes possible to solve the problem of the stagnation in the transmission buffer of the packets that have been transmitted in the other AP, and to effectively use a memory capacity of the transmission buffer.

Embodiment 2

E-2. Second Embodiment

Figure 24:
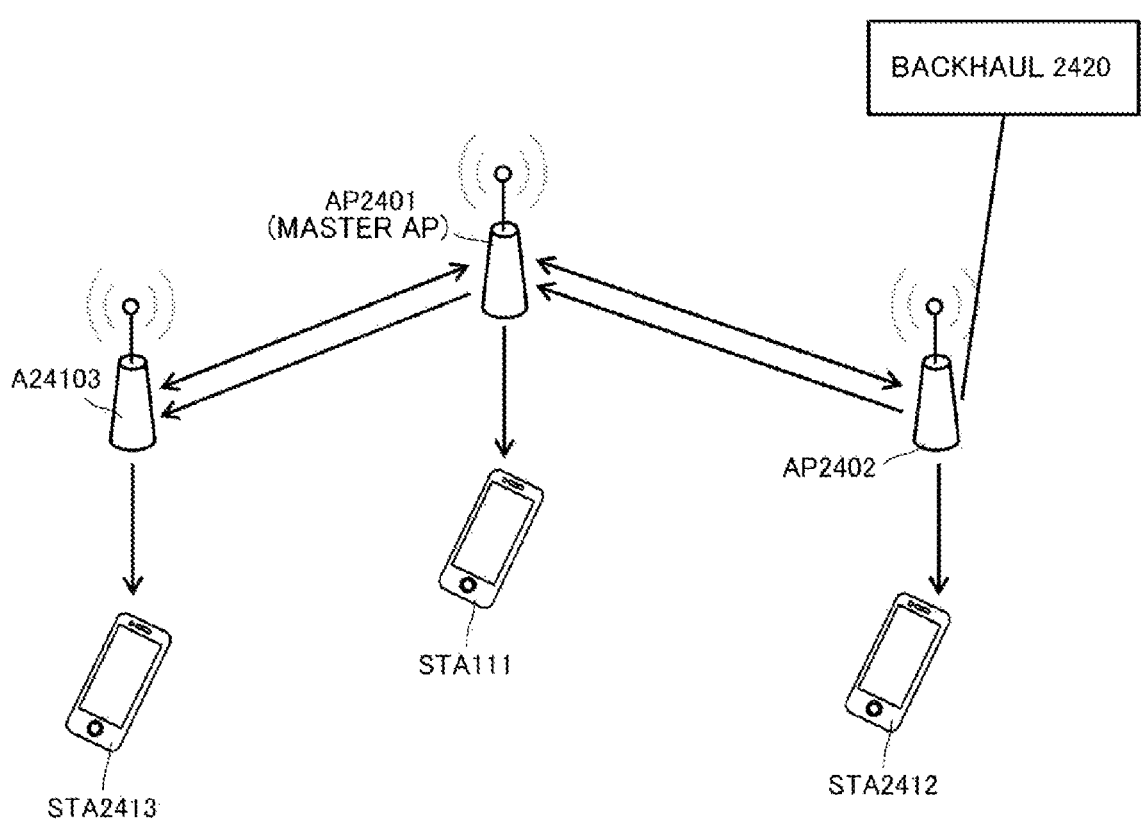
FIG. 24 is a diagram illustrating a configuration example of a system 2400.

The second embodiment assumes a system in which only one AP is connected to the backhaul by wire, and the other APs are connected to the backhaul via a multi-hop network.
E-2-1. System Configuration FIG. 24 illustrates a configuration example of a system 2400 to which the second embodiment of the present disclosure is applied. It is assumed that in the illustrated system 2400, there are three APs (base stations) 2401 to 2403 and three STAs (child stations) 2411 to 2413. It is assumed that an STA 2411 is connected to the AP 2401, an STA 2412 is connected to the AP 2402, and an STA 2413 is connected to the AP 2403. Normally, packets addressed to each STA are transmitted only from each AP that is a connection destination. When Joint Tx is performed, the same packet addressed to a certain STA is also transmitted from an AP other than the connection destination.

Only the AP 2402 is connected to a backhaul 2420 by wire, and packets addressed to each STA are first received by the AP 2402 from the backhaul 2420 via the wire and then transmitted through a wireless link of a route of AP 2402→AP 2401→AP 2403. Hereinafter, a link for packet transmission between APs is called a backhaul link, and a link for packet transmission between an AP and an STA is called a fronthaul link. Normally, on the backhaul link, a packet addressed to the STA 2413 is transmitted along the route of AP 2402→AP 2401→AP 2403, and a packet addressed to the STA 2411 is transmitted along a route of AP 2402→AP 2401. When Joint Tx is performed, all packets are transmitted along the route of AP 2402→AP 2401→AP 2403 and shared among AP 2401 to AP 2403.

It is assumed that in the backhaul link and the fronthaul link, transmission is performed in parallel using frequencies in different bands, but the same frequency channel may be subjected to time-division transmission on the backhaul link and the fronthaul link.

Further, it is assumed that a control signal for cooperative transmission exchanged between the AP 2401, which is the master AP, and the AP 2402 and AP 2403, which are non-master APs, is transmitted in a frequency band or channel of the fronthaul link, but the control signal may be transmitted using the backhaul link.

E-2-2. Device Configuration

Figure 25:
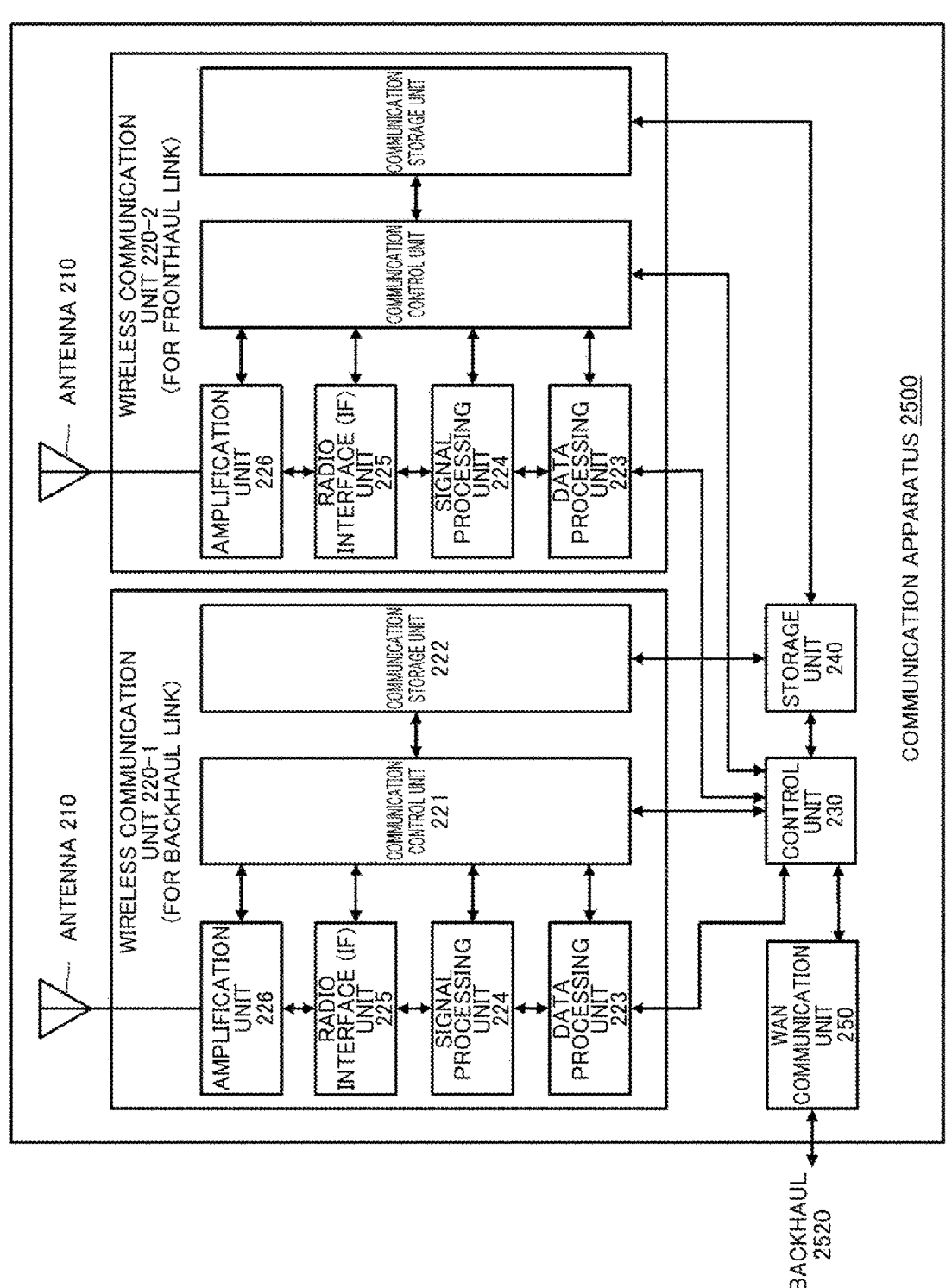
FIG. 25 is a diagram illustrating a configuration example of a communication apparatus 2500.

FIG. 25 illustrates a configuration example of a communication apparatus 2500 operating as an AP in the system 2400 illustrated in FIG. 24. A main difference between the illustrated communication apparatus 2500 and the communication apparatus 200 illustrated in FIG. 2 is that the communication apparatus 2500 individually includes a wireless communication unit 220-1 for a backhaul link and a wireless communication unit 220-2 for a fronthaul link, and the control unit 230 controls the wireless communication unit 220-1 and the wireless communication unit 220-2. The same components as those illustrated in FIG. 2 are denoted by the same names and the same reference numerals in FIG. 25. Functions of individual components have already been described, and detailed description thereof are omitted here.

E-2-3. Packet Acquisition Example

Figure 26:
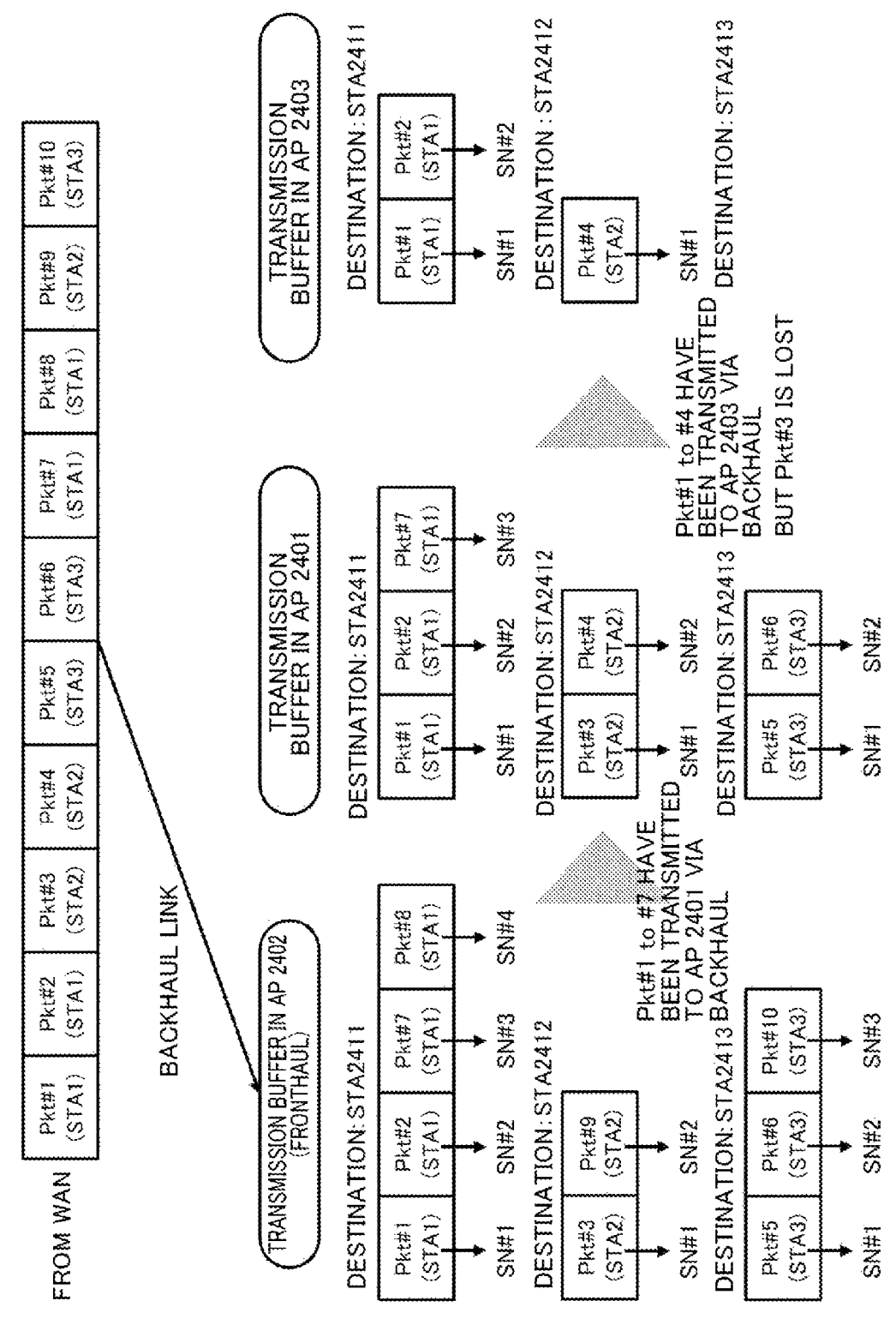
FIG. 26 is a diagram illustrating an example in which each AP manages packets acquired in a random order via a backhaul link.

FIG. 26 illustrates an example in which the respective APs 2401 to 2403 acquire the packets addressed to the respective STAs 2411 to 2413 through the backhaul link in the system 2400 illustrated in FIG. 24. However, here, it is assumed that the transmission buffer update of each AP according to the JTBB information sharing described in the first embodiment is performed as it is. Further, it is assumed that the transmission buffers of the respective APs 2401 to 2403 illustrated in FIG. 26 all show the inside of the transmission buffer for a fronthaul link.

When packets (Pkt) #1 to #10 addressed to the STAs 2411 to 2413 are transmitted from the backhaul 2420, the AP 2402 first acquires all the packets via a wire. Thereafter, packets (Pkt) #1 to #10 addressed to the STAs 2411 to 2413 are transmitted from the AP 2402 to the AP 2401 and from the AP 2401 to the AP 2403 via backhaul links.

In this case, it is assumed that the backhaul link requires some time until transmission of all the packets (Pkt) #1 to #10 is completed, on the basis of a channel sense detection result and a situation of stagnation packets. For example, packets (Pkt) #1 to #7 have already been transmitted from the AP 2402 to the AP 2401 as illustrated in FIG. 26 at a certain point in time, but a situation in which only packets (Pkt) #1 to #4 are transmitted from the AP 2401 to the AP 2403 can occur. Further, it is assumed that packet loss occurs when packets (Pkt) #1 to #10 are transmitted between the APs via the backhaul links. In the example illustrated in FIG. 26, packet (Pkt) #3 is lost at the time of transmission from the AP 2401 to the AP 2403.

Under a packet acquisition situation of each of the APs 2401 to 2403 as illustrated in FIG. 26, when the update of the transmission buffer of each AP according to JTBB information sharing described in the first embodiment has been performed as it is, packets that have not yet been transmitted on the backhaul link are regarded as a difference in the transmission buffer by paying attention only to a difference in the transmission buffer on the fronthaul link side.

Figure 27:
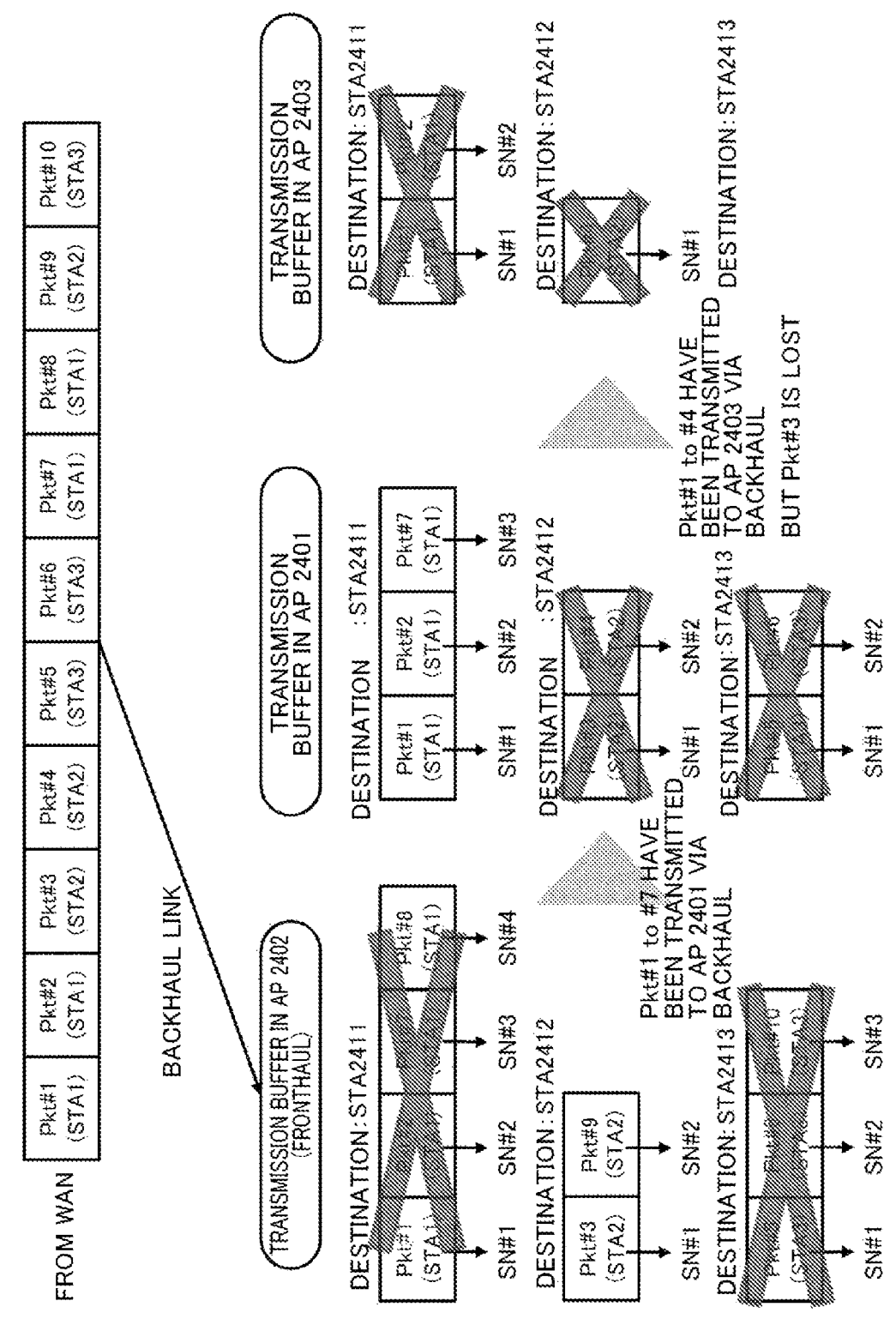
FIG. 27 is a diagram illustrating another example in which each AP manages the packets acquired in the random order via the backhaul link.

FIG. 27 illustrates a result of performing the update of the transmission buffer of each AP according to the JTBB information sharing described in the first embodiment as it is, in the packet acquisition situation of each of the APs 2401 to 2403 illustrated in FIG. 26. In the example illustrated in FIG. 27, since a difference is generated in JBTT information linked to all STAs and TIDs, each of the APs 2401 to 2403 deletes all packets addressed to STAs other than the subordinate STA from the transmission buffer in the wireless communication unit 220 for a fronthaul link. That is, due to a difference in the transmission buffer between the APs caused by delay in multi-hop transmission of packets on the backhaul link, it becomes difficult for packets to be accumulated in the transmission buffer for a fronthaul link, and there is no opportunity to perform cooperative transmission.

After the multi-hop transmission of all the packets (Pkt) #1 to #10 via the backhaul link is completed, it is possible to solve the problems described above when control can be performed so that the update of the transmission buffer of each AP according to the JTBB information sharing described in the first embodiment is performed. However, in a traffic situation in which packets are constantly arriving from the backhaul link, update of the transmission buffer of each AP according to the JTBB information sharing is likely not to be performed forever.

E-2-4. Entire Sequence

Figure 28:
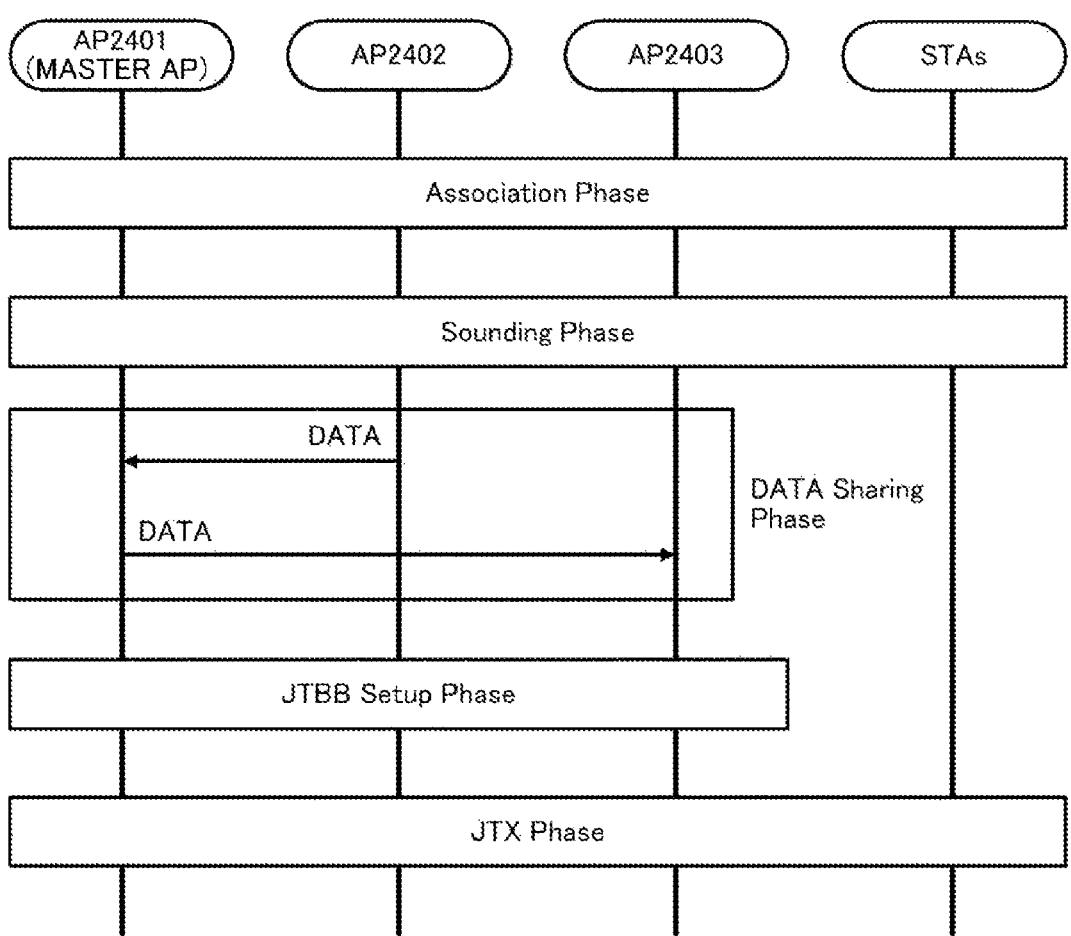
FIG. 28 is a diagram illustrating a communication sequence example (second embodiment) of the system 2400.

FIG. 28 illustrates a communication sequence example of the system 2400 in the second embodiment. The illustrated communication sequence includes respective phases of Association, Sounding, DATA Sharing, JTBB Setup, and JTX. Hereinafter, the respective phases will be described.

In the Association phase, connection processing between an AP and an STA in the same cell and connection processing between APs for a cooperative operation are performed. In the Association phase, information on the STA in each cell and Capability information of each apparatus (for example, whether or not a Joint Tx operation is possible) are exchanged.

In the Sounding phase, the AP collects information on channel information or a transmission weight required for Joint Tx from the STA. Specifically, a plurality of APs transmit known signals at the same time, and the STA performs channel estimation and then feeds back a channel estimation result or transmission weight information required for Joint Tx to the AP.

In the DATA Sharing phase, processing for sharing the packets addressed to each STA is performed among the APs 2401 to 2403. In the example illustrated in FIG. 28, the AP 2402 first acquires the packets addressed to each STA from a backhaul (not illustrated in FIG. 28) via a wire, and then the packets addressed to each STA are transmitted from the AP 2402 to the AP 2401 and from the AP 2401 to the AP 2403 via the backhaul link.

In the present embodiment, it is assumed that Ack return is not performed at least on shared data for JTX between APs, and retransmission control is not performed.

In the DATA Sharing phase, the following cases are conceivable.

(1) A case in which data sharing is performed by broadcast transmission.

(2) A case in which data transmission is performed by unicast transmission, but a receiving side does not include a memory with a sufficient capacity to store whether or not the shared data for JTX can be received.

After data for JTX is shared between APs in the DATA Sharing phase, the transmission buffer information is shared between APs in the JTBB Setup phase. Also in the second embodiment, the JTBB Setup phase is performed by the same communication sequence (see FIG. 6) as in the first embodiment.

In the JTX phase, data transmission according to Joint Tx is performed. Also in the second embodiment, the JTX phase is performed by the same communication sequence (see FIG. 12) as in the first embodiment.

E-2-5. Frame Configuration Example

Figure 29:
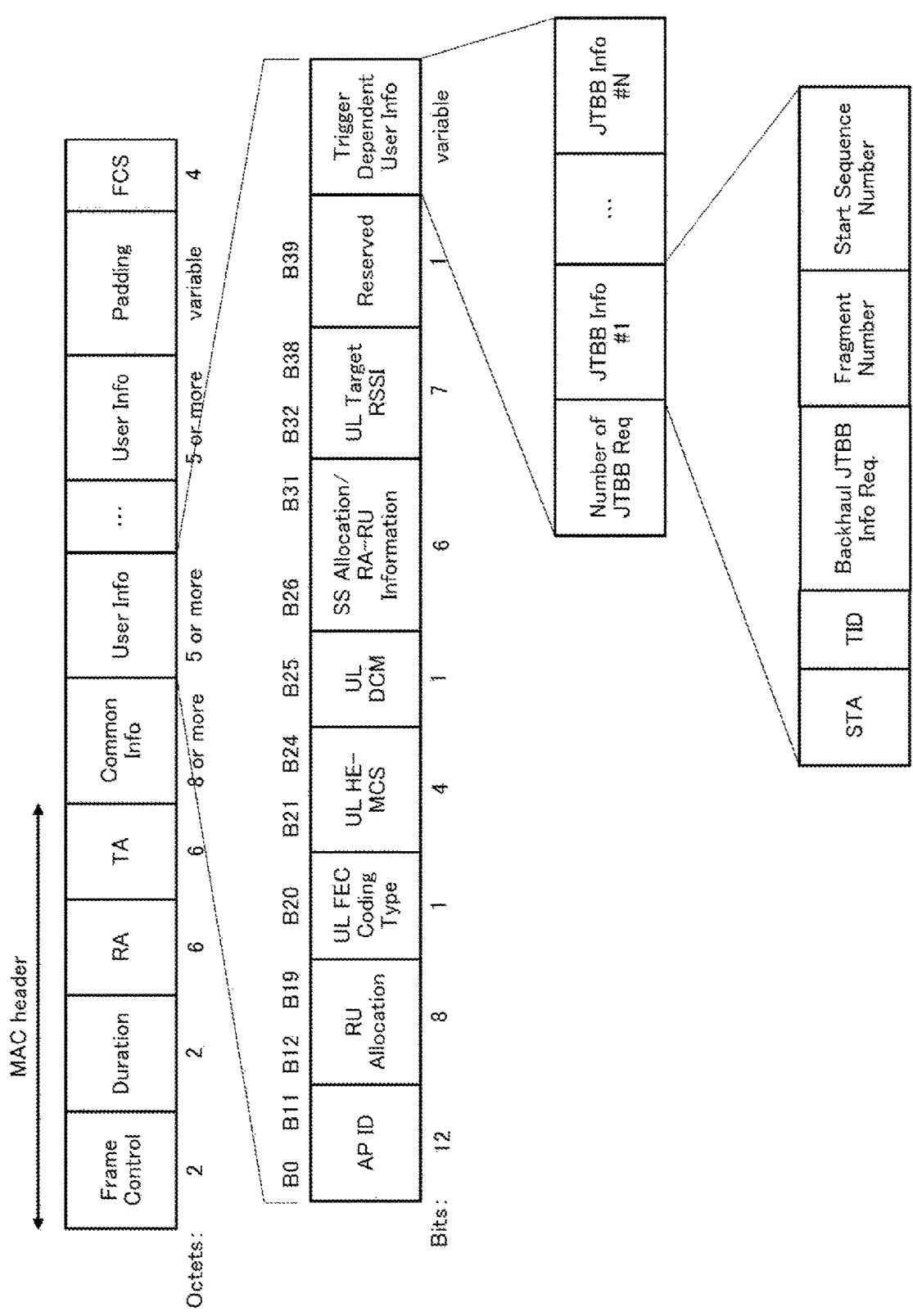
FIG. 29 is a diagram illustrating a configuration example of a JTBB Request frame.

FIG. 29 illustrates a configuration example of the JTBB Request frame used in the JTBB Setup phase in the second embodiment. The illustrated JTBB Request frame is configured on the basis of the Trigger frame of the IEEE 802.11ax, but a configuration and a variable name of the frame are not particularly limited as long as information of each of the following AP ID, Number of JTBB Info, and JTBB Info is included.

Identification information of the AP is stored in the AP ID field. The number of pieces of JTBB information is stored in the Number of JTBB Info field. The JTBB Info field is included in the JTBB Request frame by the number described in the Number of JTBB Info field.

The information on the range of the sequence number to be collected in the destination STA and TID is stored in each JTBB Info field. Specifically, STA ID, TID, Backhaul JTBB Info Req., Fragment Number, and Start Sequence Number fields are included in each JTBB Info field.

The identification information of each of the STA indicating the destination of the transmission buffer and the traffic to be queried to the AP designated by the AP ID is stored in the field of each of the STA ID and TID. A Backhaul JTBB Info Req. field is a flag for requesting bitmap information (Backhaul JTBB Info) of a transmission buffer for a backhaul link. In the frame configuration example illustrated in FIG. 29, this flag is stored in the User Info field, but when all STAs and TIDs are targeted, the flag may be stored in the Common Info field. The Start Sequence Number is a first number among sequence numbers desired to be collected.

Figure 30:
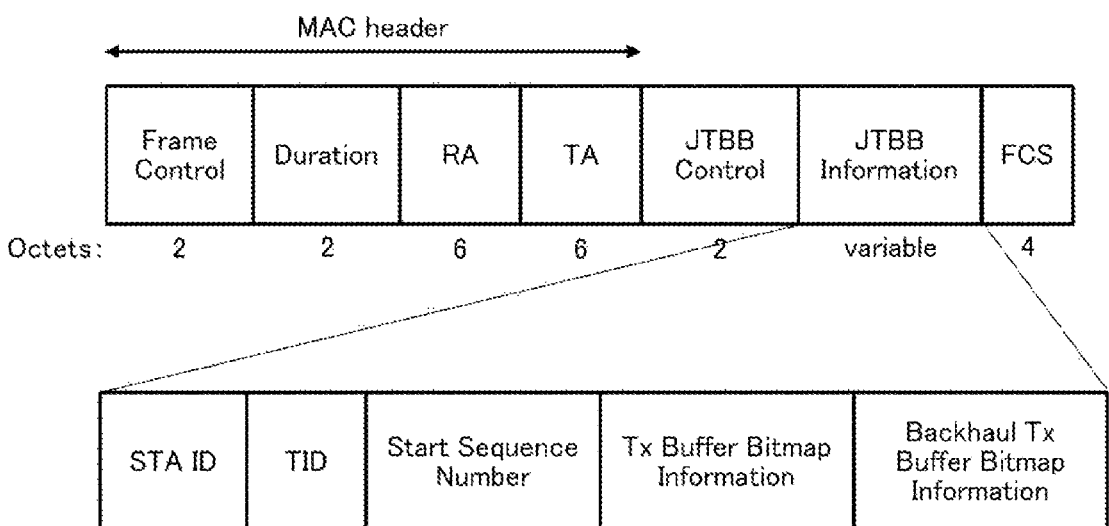
FIG. 30 is a diagram illustrating a configuration example of a JTBB Response frame.

FIG. 30 illustrates a configuration example of the JTBB Response frame used in the JTBB Setup phase in the second embodiment. The illustrated JTBB Response frame is configured on the basis of an Action frame of the IEEE 802.11-2016, but a configuration and a variable name of the frame are not particularly limited as long as information of the following JTBB Control and JTBB Info is included.

Information on a JTBB Info expression method, such as Multi-TID or Compressed is stored in the JTBB Control field.

Sequence number information for each of the destination STA and traffic information that have been held is stored in the JTBB Information field. Specifically, the JTBB Information field consists of fields of STA ID, TID, Start Sequence Number, Tx Buffer Bitmap Information, and Backhaul Tx Buffer Bitmap Information.

The identification information of the STA indicating the destination of the transmission buffer and the traffic stored in the JTBB Info field is stored in each of fields of the STA ID and the TID. The start sequence number of the packet to the destination indicated by the STA ID and the TID, which is stored in the transmission buffer, is stored in the Start Sequence Number field. Information expressing the state of the transmission buffer for a fronthaul link following the start sequence number in a bitmap format is stored in the Tx Buffer Bitmap Information field. Information expressing a state of the transmission buffer for a backhaul link following the start sequence number in a bitmap format is stored in the Backhaul Tx Buffer Bitmap Information field.

Since a configuration of the Tx Buffer Update Request frame used in the JTBB Setup phase is the same as that in the first embodiment (see FIG. 9), detailed description thereof is omitted here.

E-2-6. Operation of Master AP and Non-Master AP

Figure 31:
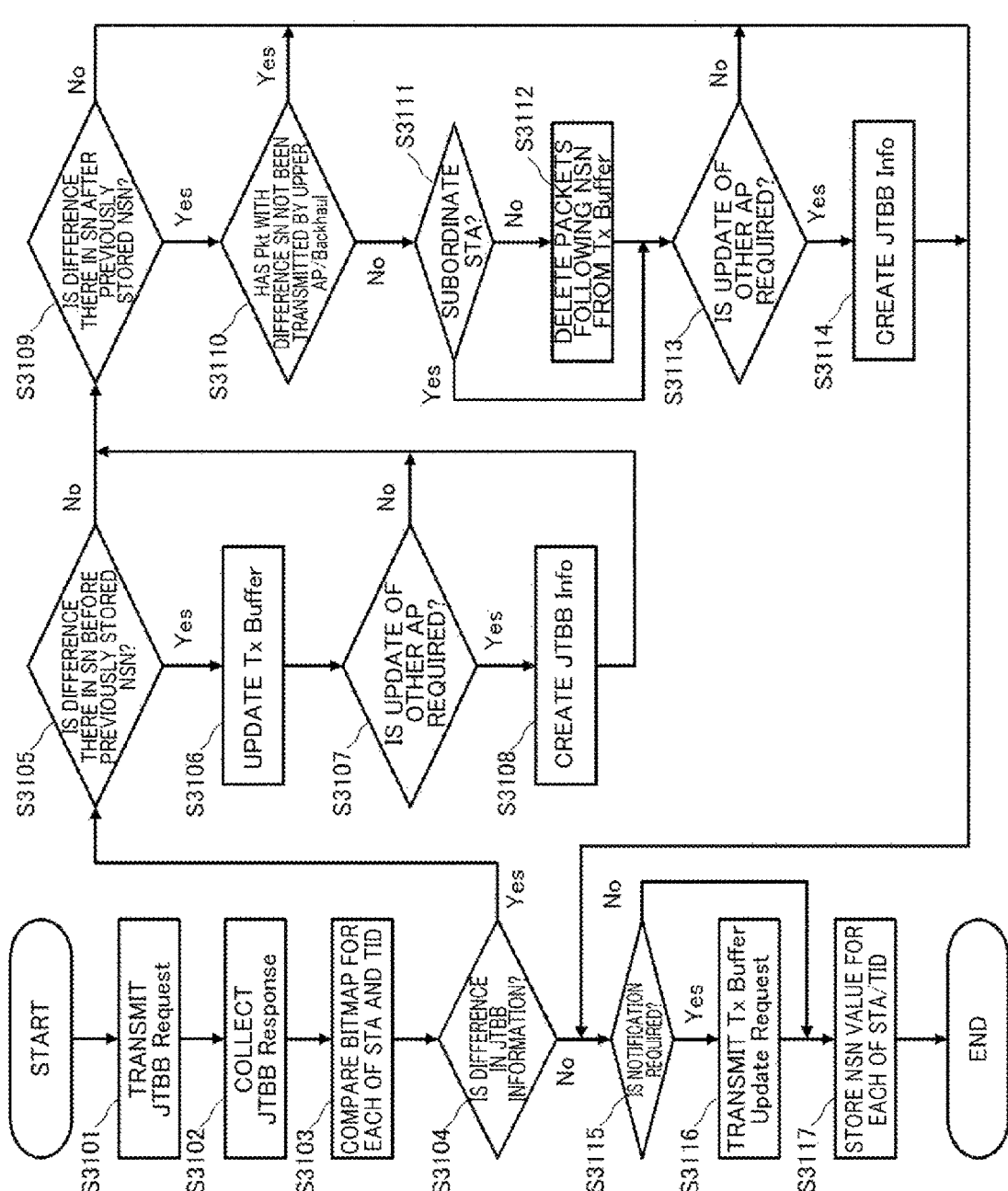
FIG. 31 is a flowchart illustrating an operation that is executed by the master AP.

FIG. 31 illustrates an operation executed by the master AP in the JTBB Setup phase in a flowchart format.

The master AP first transmits the JTBB Request frame to the non-master AP at the time of start of the JTBB Setup (step S3101). In this case, Backhaul JTBB Info Req.="1" is set in order to request the bitmap information of the transmission buffer for a backhaul link. The master AP receives the JTBB Response frame from the non-master AP (step S3102) to collect the JTBB Response frame including the JTBB information (Backhall JTBB Info) for a fronthaul link and a backhaul link for each of the STA and the TID of the non-master AP.

Next, the master AP compares the JTBB information for a fronthaul link and a backhaul link for each of the STA and the TID held by each AP (step S3103), and determines whether there is a difference (step S3104).

When a difference is generated in the JTBB information of one of the STA and the TID held by each AP (Yes in step S3104), the master AP further checks whether a difference is generated the sequence number before the previously stored NSN for the STA and TID (step S3105). When a difference is generated in the sequence numbers before the previously stored NSN (Yes in step S3105), the master AP updates its own transmission buffer to be matched with the JTBB information of the connection destination AP of the STA that is the destination of the packet (step S3106).

Next, the master AP determines whether the other APs also need to update the transmission buffers (step S3107). When other APs also need to update the transmission buffer (Yes in step S3107), the master AP creates the JTBB Info and stores the JTBB Info in the Tx Buffer Update Request frame (step S3108).

Next, the master AP further checks whether or not a difference is generated in the sequence number following the previously stored NSN (step S3109). When a difference is generated in the sequence number after the previously stored NSN (Yes in step S3109), the master AP further checks whether the packet with the sequence number that is the difference has not been transmitted by an upper AP of the backhaul link (that is, whether the packet remains in a transmission buffer for a backhaul link of the upper AP of the backhaul link) (step S3110).

When the packet with the sequence number to be the difference has not been transmitted by the upper AP of the backhaul link or the backhaul link (Yes in step S3110), the master AP waits until the packet with the sequence number that becomes the difference arrives without performing the update of its own transmission buffer and the transmission buffer of the lower AP of the backhaul link.

In the system 2400 illustrated in FIG. 24, the upper AP of the backhaul link of the AP 2401 that is the master AP is the AP 2402. When it is found that the AP 2402 acquires the packets with sequence numbers #1 to #4 addressed to the STA 2411 in the transmission buffer for a fronthaul link, whereas the AP 2401 acquires only the packets with sequence numbers #1 to #3 addressed to the subordinate STA 2411 in the transmission buffer for a fronthaul link, the AP 2401 waits until the next packet addressed to the STA 2411 arrives from the AP 2402 on the backhaul link, and transmits the packet to the lower AP 2403 of the backhaul link when the packets arrives.

On the other hand, when the packet with the sequence number that is the difference has already been transmitted by the upper AP of the backhaul link or the backhaul link (No in step S3110), the master AP checks whether the STA that is the destination of the packet is the subordinate STA (step S3111).

When the STA that is the destination of the packet is not the subordinate STA (No in step S3111), the master AP deletes all packets following the NSN from its own transmission buffer (step S3112). This is because the master AP cannot determine which of the packets following the NSN has not been acquired. Even when a difference occurs in one sequence number, the master AP determines that the cooperative transmission is not possible for all packets whose sequence numbers are likely to differ.

Next, the master AP determines whether the other APs also need to update the transmission buffers (step S3113). When it is necessary to update the transmission buffers of other APs (Yes in step S3113), the master AP creates the JTBB Info and stores the JTBB Info in the Tx Buffer Update Request frame (step S3114). This JTBB Info includes the same information as the JTBB Info of the connection destination AP of the STA that is the destination of the packet.

In the first embodiment, for example, when the AP 2401 performs comparison with the JTBB Info of the AP 2402, and the AP 2401 deletes all packets addressed to the STA 2412 (that is, addressed to the non-subordinate STA) in its own transmission buffer at a point in time at which it is found that a difference is generated in the transmission buffer between the APs. On the other hand, in the second embodiment, that is, in the processing procedure illustrated in FIG. 31, when the packet with sequence number #3 addressed to the STA 2412, which is the difference, remains in the transmission buffer for a backhaul link of the AP 2402, the AP 2401 determines that there is no difference in sequence number for the packet, and does not perform update of the transmission buffer. Therefore, even when a difference in transmission buffer between the APs is generated due to a delay in multi-hop transmission of packets on the backhaul link as illustrated in FIG. 27, the packets are not deleted from the transmission buffer for a fronthaul link and it is possible to increase an opportunity to perform cooperative transmission.

The master AP checks a difference in JTBBs of all the STAs and TIDs and then, when there is no difference in the JTBB information for a fronthaul link and a backhaul link for each of the STA and the TID held by each AP (No in step S3104), the master AP determines whether or not it is necessary to notify the other APs of the Tx Buffer Update Request frame (step S3115). When it is necessary to notify the other APs of the Tx Buffer Update Request frame (Yes in step S3115), the master AP transmits the Tx Buffer Update Request frame to the APs (step S3116). Finally, the master AP sets the NSN for each of the STA and the TID (step S3117), and ends the present processing.

Figure 32:
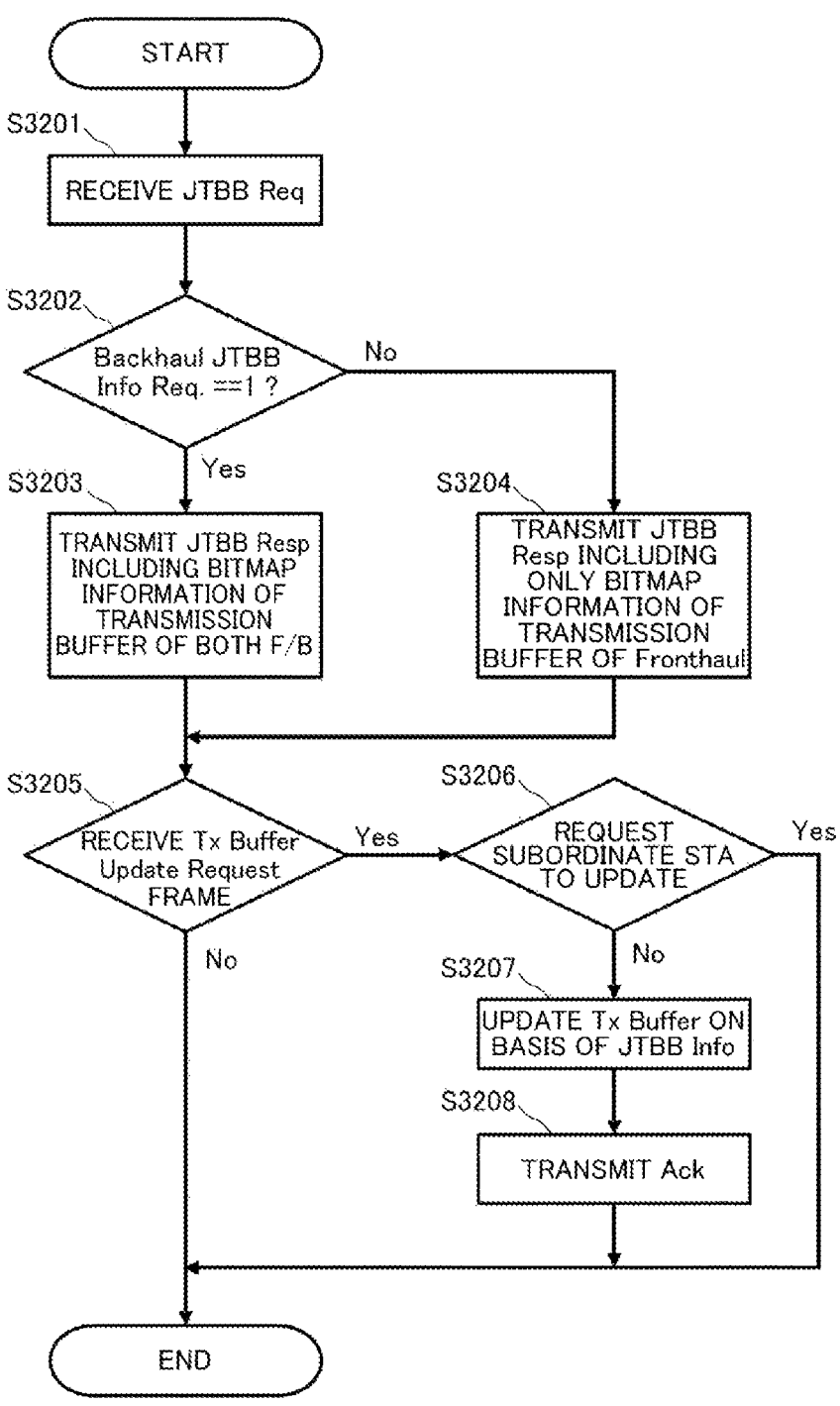
FIG. 32 is a flowchart illustrating an operation that is executed by a non-master AP.

FIG. 32 illustrates an operation that is executed by the non-master AP in the JTBB Setup phase in a flowchart format.

When the non-master AP receives the JTBB Request frame from the master AP (step S3201), the non-master AP checks whether or not Backhaul JTBB Info Req.=="1" that is a flag for requesting bit map information of the transmission buffer for a backhaul link is set (step S3202).

When Backhaul JTBB Info Req.=="1" is set (Yes in step S3202), the non-master AP generates a JTBB Response frame including bitmap information of the transmission buffer of both the fronthaul link and the backhaul link, and transmits the JTBB Response frame using resources indicated by the master AP (step S3203).

On the other hand, when Backhaul JTBB Info Req.=="1" is not set (No in step S3202), the non-master AP generates the JTBB Response frame including only the bitmap information of the transmission buffer of a fronthaul link, and transmits the JTBB Response frame using resources indicated by the master AP (step S3204).

Thereafter, when the non-master AP receives the Tx Buffer Update Request frame from the master AP (Yes in step S3205), the non-master AP determines whether or not the STA requested to be updated in the frame is a subordinate STA (step S3206).

When the destination of the transmission buffer requested to be updated in the received Tx Buffer Update Request frame is the subordinate STA (Yes in step S3206), the non-master AP ends the present processing without performing update of its own transmission buffer.

On the other hand, when the destination of the transmission buffer requested to be updated in the received Tx Buffer Update Request frame is not the subordinate STA (No in step S3206), the non-master AP updates its own transmission buffer on the basis of the JTBB Info stored in the frame (step S3207), returns an Ack frame to the master AP (step S3208), and ends the present processing.

E-2-7. Internal Operation

In this section E-2-7, an operation in the communication apparatus 2500 operating as an AP for realizing the operation described in the section E-2-6 will be described.

Figure 33:
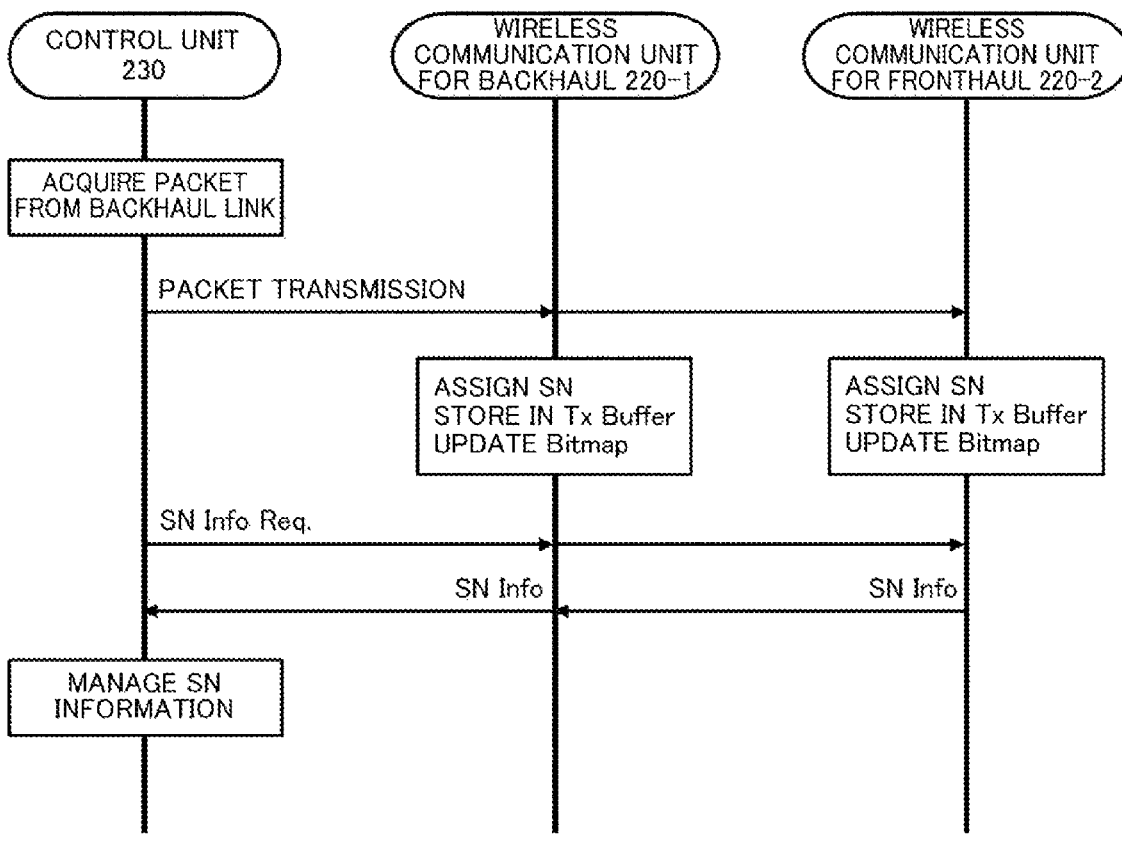
FIG. 33 is a diagram illustrating an internal operation example of a communication apparatus operating as an AP (when a packet is acquired from a backhaul link).

FIG. 33 illustrates an internal operation sequence example when the communication apparatus 2500 operating as an AP acquires a packet from the backhaul link. However, the AP performs packet transmission on both the fronthaul link and the backhaul link. The AP corresponds to the AP 2401 and the AP 2402 in the system 2400 illustrated in FIG. 24.

When the control unit 230 acquires a packet from the backhaul link, the control unit 230 transmits the packet to both the wireless communication unit 220-1 for a backhaul link and the wireless communication unit 220-2 for a fronthaul link.

The wireless communication unit 220-1 for a backhaul link and the wireless communication unit 220-2 for a fronthaul link perform assignment of the sequence number to the packet, storage in the transmission buffer, and update of the bitmap information in the respective MAC layers.

Thereafter, the control unit 230 requests each of the wireless communication unit 220-1 for a backhaul link and the wireless communication unit 220-2 for a fronthaul link to provide the sequence number information (SN Info) of the packet, and acquires the sequence number information of the packet from each of the wireless communication unit 220-1 for a hall link and the wireless communication unit 220-2 for a fronthaul link.

The control unit 230 associates and manages information on the sequence number of the packet of each of the wireless communication unit 220-1 for a backhaul link and the wireless communication unit 220-2 for a fronthaul link.

Figure 34:
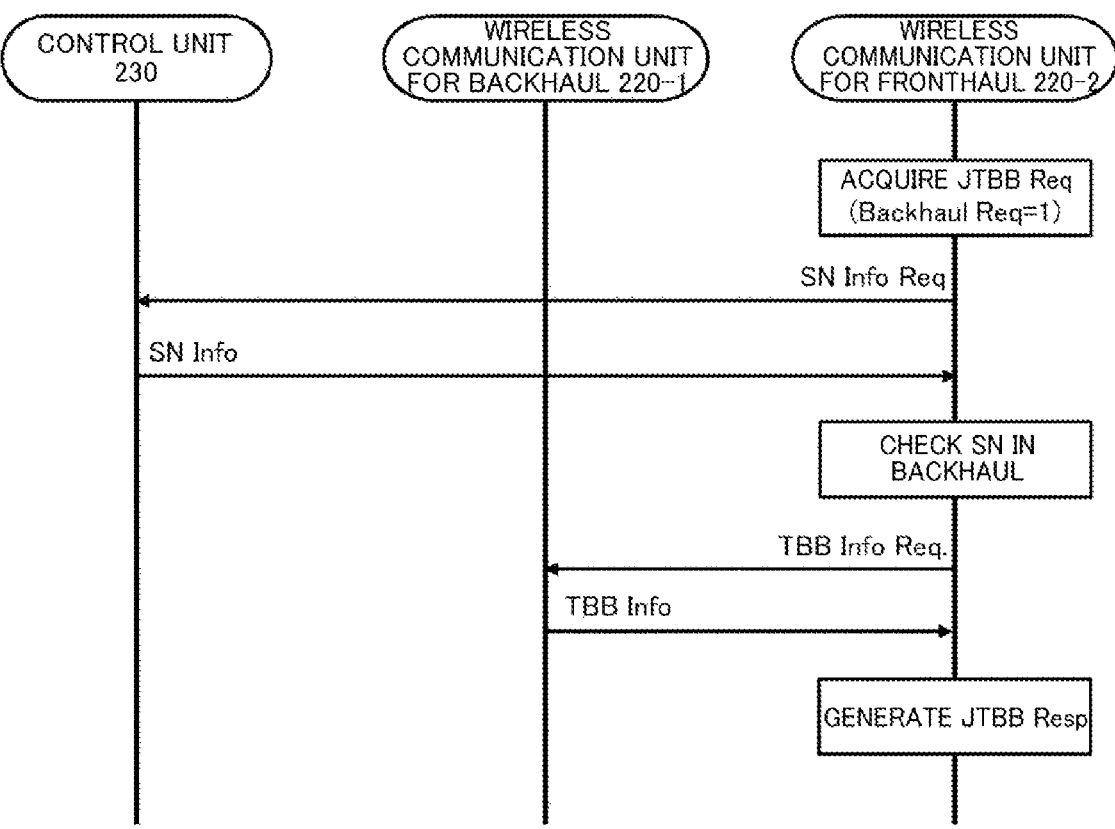
FIG. 34 is a diagram illustrating an internal operation example of a communication apparatus operating as an AP (when a JTBB Response frame is generated).

FIG. 34 illustrates an internal operation sequence example when the communication apparatus 2500 operating as a non-master AP generates a JTBB Response including JTBB Info of the backhaul link in response to a request from the master AP. However, the AP performs packet transmission on both the fronthaul link and the backhaul link. However, the AP performs packet transmission on both the fronthaul link and the backhaul link. The AP corresponds to the AP 2401 and the AP 2402 in the system 2400 illustrated in FIG. 24.

The wireless communication unit 2202 for a fronthaul link acquires JTBB Req. of Backhaul Req.=1 from the master AP via the fronthaul link, the wireless communication unit 2202 for a fronthaul link first inquires the control unit 230 about the information on the sequence number of the wireless communication unit for a backhaul link corresponding to the requested sequence number (or the sequence number corresponding to the bitmap of the transmission buffer for a fronthaul link).

When the wireless communication unit 220-2 for a fronthaul link acquires the inquired information on the sequence number from the control unit 230, the wireless communication unit 220-2 for a fronthaul link requests the wireless communication unit 220-1 for a backhaul link to provide a Transmit Buffer Bitmap (TBB) in a form converted into the sequence number on the backhaul link side, and acquires the Transmit Buffer Bitmap (TBB). The wireless communication unit 220-2 for a fronthaul link generates the JTBB Response on the basis of the acquired TBB information.

The control unit 230 manages the information on the sequence number of both the wireless communication unit 220-1 for a backhaul link and the wireless communication unit 220-2 for a fronthaul link in this way, making it possible for the non-master AP to perform conversion from the sequence number assigned by the wireless communication unit 220-1 for a backhaul link into the sequence number managed by the wireless communication unit 220-2 for a fronthaul link when generating the JTBB Info of the backhaul link. Further, for the master AP, similarly, it is possible to easily compare the JTBB Info of the fronthaul link with the JTBB Info of the backhaul link as described above.

E-2-8. Effects

This section describes effects provided by the second embodiment of the present disclosure.

Figure 35:
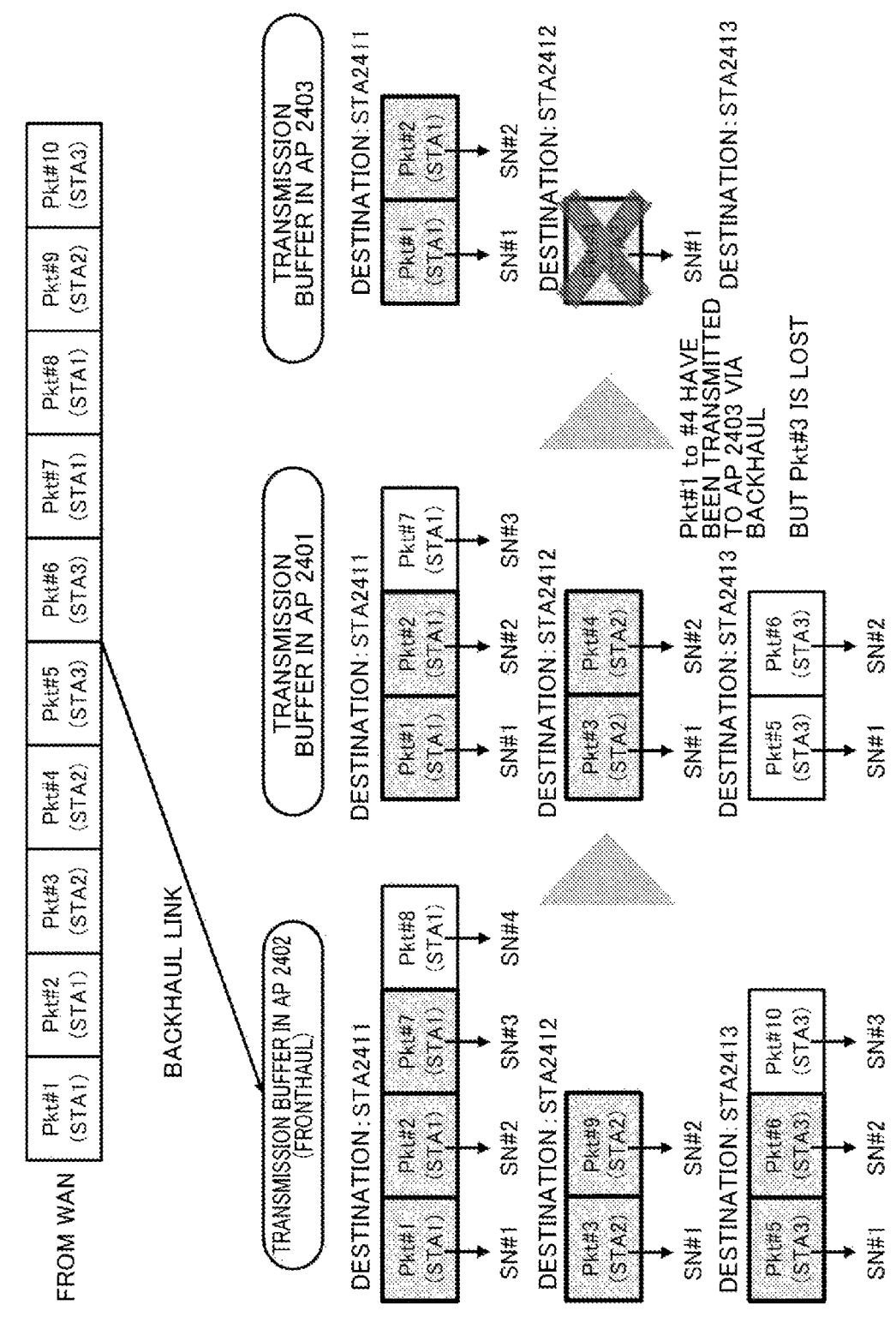
FIG. 35 is a diagram illustrating an example (first embodiment) in which each AP manages packets acquired in a random order from a backhaul.

FIG. 35 illustrates an example in which the respective APs 2401 to 2403 acquire the packets addressed to the respective STAs 2411 to 2413 through the backhaul link in the system 2400 illustrated in FIG. 24.

In the second embodiment, information including the transmission buffer information of the wireless communication unit 220-1 for a backhaul link is shared on the fronthaul side, making it possible to accurately detect the difference in transmission buffer information in the wireless communication unit 220-2 for a fronthaul link included in each of the APs 2401 to 2403.

For example, the master AP (the AP 2401 in the system illustrated in FIG. 24) can ascertain the transmitted packets, and untransmitted packets on the backhaul link from the JTBB Info of the backhaul link of the upper AP (the upper AP of the AP 2401 is the AP 2402, and the upper AP of the AP 2403 is the AP 2401). In FIG. 35, packets that have already been transmitted are shown with packets being surrounded by thick lines and filled with gray.

Focusing on the packets addressed to the STA 2411, the AP 2401 has acquired the packets with sequence numbers #1 to #3, whereas the upper AP 2402 holds the packets with sequence numbers #1 to #4. Here, it can be seen from the JTBB Info of the backhaul that the packet with sequence number #4 addressed to the STA 2411 has not yet been transmitted. Therefore, the AP 2401 can determine that mismatch of the sequence numbers does not occur in the transmission buffer for a fronthaul link at a current point in time. Therefore, the AP 2401 does not perform the update of its own transmission buffer for a fronthaul link at this point in time. As a result, a state in which the APs 2401 to 2403 can perform Joint Tx on the packets with sequence numbers #1 to #3 addressed to the STA 2411 is maintained. According to the second embodiment, a cooperative transmission opportunity is not lost due to a difference in transmission buffer for a fronthaul link between the APs caused by non-transmission on the backhaul link.

On the other hand, between the AP 2401 and the AP 2403, the AP 2401 holds packets with sequence numbers #1 and #2 addressed to the STA 2412, whereas the AP 2403 can acquire only the packet with sequence number #1. Here, when it is found from the JTBB Info of the backhaul link that the packet with sequence number #2 has already been transmitted, the AP 2401 requests the AP 2403 to delete all new acquired packets addressed to the STA 2412 from the transmission buffer, as in the first embodiment.

F. Effects

In this section, effects of the present disclosure are summarized.

According to the present disclosure, in APs that perform joint Tx in cooperation, it is possible to prevent the packet sequence numbers from being mismatched due to a packet loss or the like, and to avoid cooperative transmission of different packets. Further, it is possible to avoid tightness of the memory capacity by periodically deleting packets transmitted by one AP alone without cooperation from the transmission buffers of other APs.

The first embodiment deals with a case in which all the APs are connected to the backhaul by wire, and the second embodiment deals with a case in which the APs are wirelessly connected to the backhaul. According to the present disclosure, in any case, it is possible to prevent packet sequence numbers from being mismatched due to a packet loss or the like, and to avoid cooperative transmission of different packets. In particular, in the second embodiment, it is possible to realize packet management cooperated between the backhaul link and the fronthaul link through information exchange between the wireless communication unit for a backhaul link and the wireless communication unit for a fronthaul link inside the communication apparatus operating as the AP.

The present disclosure can be realized mainly by processing on layers below the MAC layer, and does not require cooperation or joint management with layers above TCP/IP. Therefore, the present disclosure can be realized by an operation as a single wireless LAN.

INDUSTRIAL APPLICABILITY

The present disclosure has been described in detail above with reference to specific embodiments. However, it is obvious that those skilled in the art can perform modification or substitution of the embodiments without departing from the gist of the present disclosure.

In the present specification, the embodiments in which the present disclosure is applied to a wireless LAN have been mainly described, but the gist of the present disclosure is not limited thereto. For example, the present disclosure can be similarly applied to mobile communication systems such as 3GPP, and communication systems of other standards.

In short, the present disclosure has been described in the form of examples, and the described content of the present specification should not be construed in a restrictive manner. The claims should be considered in order to determine the gist of the present disclosure.

The present disclosure can also be configured as follows.

(1) A communication apparatus configured to operate as an AP configured to transmit packets to a subordinate STA and an STA connected to another AP, the communication apparatus including:

a storage unit including a transmission buffer configured to store packets for each STA; and a control unit configured to control processing for sharing information on a sequence number of a transmission buffer for each STA between the APs.

(2) The communication apparatus according to (1), wherein the control unit collects the information on the sequence number of the transmission buffer of each STA of each AP, and controls processing for updating the transmission buffer of each AP on the basis of a difference in information related to the sequence number of the transmission buffer of each STA between the APs.

(3) The communication apparatus according to (1), wherein the control unit transmits information on the sequence number of the transmission buffer for each STA of the AP to the other AP on the basis of a request from the other AP.

(4) The communication apparatus according to any one of (1) to (3), wherein the control unit performs processing for updating a state of the transmission buffer of the other AP on the basis of a state of a transmission buffer of a connection destination AP of the STA when there is a difference in information on the sequence number of the transmission buffer addressed to one of STAs between the APs.

(5) The communication apparatus according to (4), wherein the control unit performs processing for updating a state of the transmission buffer of the AP on the basis of the transmission buffer of the connection destination AP of the STA when a difference is generated in information related to a sequence number before a previously confirmed sequence number in the transmission buffer addressed to one of the STAs.

(6) The communication apparatus according to (4), wherein the control unit deletes information after previous checked information addressed to the STA from the transmission buffer of the AP when a difference is generated in information related to a sequence number after a previous checked sequence number in the transmission buffer addressed to a non-subordinate STA.

(7) The communication apparatus according to (4), wherein the control unit performs processing for transmitting, to the other AP, a request to update the transmission buffer, on the basis of a state of the transmission buffer of the connection destination AP of the STA, when there is a difference in the information related to the sequence number of the transmission buffer addressed to one of the STAs between the APs.

(8) The communication apparatus according to (1), wherein a multi-hop network is constructed between the APs, the storage unit includes a first transmission buffer configured to store packets to the STA, and a second transmission buffer configured to store packets to be transmitted over the multi-hop network, and the control unit controls processing for sharing information on a sequence number of the first transmission buffer and information on a sequence number of the second transmission buffer between the APs.

(9) The communication apparatus according to (8), wherein the control unit controls processing of updating the first transmission buffer of each AP on the basis of a difference in information on the sequence number of the first transmission buffer and a difference in information on the sequence number of the second transmission buffer.

(10) The communication apparatus according to any one of (1) to (9), wherein the control unit checks whether the other AP holds a packet to be transmitted on the basis of the information related to the sequence number of the transmission buffer for each STA between the APs, and performs a determination as to whether or not cooperative transmission is able to be performed, and selection of an AP of which the cooperative transmission is requested, when transmission right is acquired or a cooperative transmission request is received from the other AP.

(11) A communication method in an AP configured to transmit packets to a subordinate STA and an STA connected to another AP, the communication method including:

storing packets for each STA in a transmission buffer; and sharing information related to a sequence number of the transmission buffer for each STA between the APs.

REFERENCE SIGNS LIST

200 Communication apparatus
210 Antenna
220 Wireless communication unit
221 Communication control unit
222 Communication storage unit
223 Data processing unit
224 Signal processing unit
225 Wireless interface unit
226 Amplification unit
230 Control unit
240 Storage unit
250 WAN control unit

The invention claimed is:

1. A communication apparatus, comprising:

circuitry including a first transmission buffer configured to store a first plurality of packets for a plurality of stations, wherein the plurality of stations includes a subordinate station and a first station, the first station is connected to a first access point of a plurality of access points, the communication apparatus is a master access point configured to transmit the stored first plurality of packets to the subordinate station and the first station, the plurality of access points is different from the master access point, and the circuitry is configured to:

control reception, from the plurality of access points, of first information associated with a first sequence number of a second plurality of packets stored in a first plurality of transmission buffers of the plurality of access points, wherein the second plurality of packets is associated with the plurality of stations, and the first transmission buffer is different from the first plurality of transmission buffers;

determine, based on the received first information, a first difference between the first sequence number of the second plurality of packets and a second sequence number of the stored first plurality of packets; and update the first plurality of transmission buffers of the plurality of access points based on the determined first difference.

2. The communication apparatus according to claim 1, wherein the circuitry is further configured to:

receive a request from each of the plurality of access points; and transmit, to the each of the plurality of access points, second information associated with the second sequence number of the stored first plurality of packets.

3. The communication apparatus according to claim 1, wherein the circuitry is further configured to:

determine, based on the received first information, a second difference between a state of a second transmission buffer of the first access point and a state of a third transmission buffer of a second access point of the plurality of access points, wherein the first plurality of transmission buffers includes the second transmission buffer and the third transmission buffer, the first access point is a connection destination of the first station, and each of the second transmission buffer and the third transmission buffer is addressed to the first station; and control, based on the determined first difference and the state of the second transmission buffer of the first access point, an update process of the state of the third transmission buffer of the second access point.

4. The communication apparatus according to claim 3, wherein the circuitry is further configured to:

detect, based on the received first information, a third difference in a third sequence number before a previously confirmed sequence number of a set of packets of the second plurality of packets, wherein the set of packets is stored in the second transmission buffer of the first access point; and control, based on the detected third difference, the update process of the state of the third transmission buffer.

5. The communication apparatus according to claim 3, wherein the circuitry is further configured to:

detect, based on the received first information, a third difference in a third sequence number after a previous checked sequence number, wherein the third sequence number is associated with a set of packets stored in a fourth transmission buffer of the first access point, the first plurality of transmission buffers includes the fourth transmission buffer, the second plurality of packets includes the set of packets, the fourth transmission buffer is addressed to a second station of the plurality of stations, and the second station is a non-subordinate station for the first access point; and delete, based on the detected third difference, the set of packets stored in the fourth transmission buffer of the first access point.

6. The communication apparatus according to claim 3, wherein the circuitry is further configured to transmit, based on the determined second difference, to the second access point, a request to update the third transmission buffer of the second access point, and the update of the third transmission buffer is based on the state of the second transmission buffer of the first access point.

7. The communication apparatus according to claim 1, wherein the plurality of access points and the master access point construct a multi-hop network, the circuitry further includes a second transmission buffer configured to store a third plurality of packets for transmission over the multi-hop network, the circuitry is further configured to control reception, from the plurality of access points, of second information associated with a third sequence number of a fourth plurality of packets stored in a second plurality of transmission buffers of the plurality of access points, the second plurality of transmission buffers is associated with the multi-hop network, and the second transmission buffer is different from the second plurality of transmission buffers.

8. The communication apparatus according to claim 7, wherein the circuitry is further configured to:

determine a second difference between the third sequence number of the fourth plurality of packets and a fourth sequence number of the stored third plurality of packets; and update the first plurality of transmission buffers of the plurality of access points further based on the determined second difference.

9. The communication apparatus according to claim 1, wherein the circuitry is further configured to:

determine, based on the received first information, the first access point holds a packet of the second plurality of packets for transmission;

acquire at least one of a transmission right or a cooperative transmission request from the first access point;

determine a possibility of cooperative transmission based on the determination that the first access point holds the packet, and the at least one of the acquired transmission right or the acquired cooperative transmission request; and select the first access point based on the determined possibility of cooperative transmission.

10. A communication method, comprising:

in a master access point that includes a transmission buffer:

storing, in the transmission buffer, a first plurality of packets for a plurality of stations, wherein the plurality of stations includes a subordinate station and a station, the station is connected to an access point of a plurality of access points, the plurality of access points is different from the
master access point, and the master access point is configured to transmit the
stored first plurality of packets to the subordinate
station and the station;

receiving, from the plurality of access points, informa-
tion associated with a first sequence number of a
second plurality of packets stored in a plurality of
transmission buffers of the plurality of access points,
wherein the second plurality of packets is associated with the
plurality of stations, and the transmission buffer is different from the plurality
of transmission buffers;

determining, based on the received information, a dif-
ference between the first sequence number of the
second plurality of packets and a second sequence
number of the stored first plurality of packets; and update the plurality of transmission buffers of the
plurality of access points based on the determined
difference.

* * * * *